US012348279B2

(12) United States Patent
Ramasamy et al.

(10) Patent No.: US 12,348,279 B2
(45) Date of Patent: *Jul. 1, 2025

(54) METHOD AND APPARATUS FOR WI-FI OPEN LOOP TUNING AND CORRECTION BASED ON BAND AGGREGATION AND LOADING USING RADIO AND SYSTEM TELEMETRY

(71) Applicant: Dell Products LP, Round Rock, TX (US)

(72) Inventors: Suresh K. Ramasamy, Cedar Park, TX (US); Lars Fredrik Proejts, Taipei (TW)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,896

(22) Filed: May 26, 2024

(65) Prior Publication Data

US 2024/0313871 A1 Sep. 19, 2024

Related U.S. Application Data

(63) Continuation of application No. 17/497,764, filed on Oct. 8, 2021, now Pat. No. 11,996,901.

(51) Int. Cl.
*H04B 17/309* (2015.01)
*H01Q 3/36* (2006.01)

(52) U.S. Cl.
CPC ............. *H04B 17/309* (2015.01); *H01Q 3/36* (2013.01)

(58) Field of Classification Search
CPC .................. H04B 17/309; H01Q 3/36
See application file for complete search history.

(56) References Cited

U.S. PATENT DOCUMENTS 8,229,380 B2 7/2012 Someya
9,084,124 B2 7/2015 Nickel
(Continued)

FOREIGN PATENT DOCUMENTS

| EP | 3242718 B1 | 5/2019 |
|---|---|---|
| WO | 2013/095734 A1 | 6/2013 |
| WO | 2018/189578 A1 | 10/2018 |

*Primary Examiner* — Raymond S Dean
(74) *Attorney, Agent, or Firm* — Prol Intellectual Property Law, PLLC; H. Kenneth Prol

(57) ABSTRACT

An information handling system may include a processor; a memory; a power management unit (PMU); a wireless interface adapter to communicate via an antenna to a wireless network; an antenna controller to: receive, via a sideband wireless communication link, network telemetry data descriptive of network operating frequency bands and network frequency channels from a remote optimizing information handling system management system for a wireless protocol; receive operating characteristics associated with the operation of the information handling system indicating at least one detuning trigger for a network operating frequency band for a wireless protocol link for the wireless network; execute instructions of an antenna tuning algorithm to determine a tune state of the antenna, and issue instructions to a radio frequency switch including a resistor, inductor, and capacitor (RLC) circuit tuner at the antenna to tune the antenna to transceive data at the network operating frequency band to a target frequency commensurate with the network telemetry data descriptive of the wireless link according to the tune state.

20 Claims, 10 Drawing Sheets

(56) References Cited

U.S. PATENT DOCUMENTS

| | | |
|---|---|---|
| 10,498,012 B2 | 12/2019 | Judkins |
| 2011/0292807 A1* | 12/2011 | Shah ................. H04W 24/02 |
| | | 370/235 |
| 2011/0299454 A1* | 12/2011 | Krishnaswamy ........................... |
| | | H04W 52/0229 |
| | | 370/328 |
| 2012/0013296 A1 | 1/2012 | Heydari |
| 2015/0314526 A1* | 11/2015 | Cohen ................... H01Q 9/40 |
| | | 343/907 |
| 2016/0049924 A1 | 2/2016 | Broyde |
| 2017/0077605 A1* | 3/2017 | Wonterghem .......... H01Q 5/378 |
| 2017/0346516 A1 | 11/2017 | Ripley |
| 2019/0052748 A1* | 2/2019 | Stewart ............. H04M 1/72463 |
| 2019/0341701 A1 | 11/2019 | Yu |
| 2020/0007177 A1 | 1/2020 | Ripley |
| 2020/0382200 A1 | 12/2020 | Hormis |
| 2020/0389856 A1* | 12/2020 | Yao ....................... H04B 17/26 |

\* cited by examiner

METHOD AND APPARATUS FOR WI-FI OPEN LOOP TUNING AND CORRECTION BASED ON BAND AGGREGATION AND LOADING USING RADIO AND SYSTEM TELEMETRY

This application is a continuation of prior application Ser. No. 17/497,764, entitled "METHOD AND APPARATUS FOR WI-FI OPEN LOOP TUNING AND CORRECTION BASED ON BAND AGGREGATION AND LOADING USING RADIO AND SYSTEM TELEMETRY," filed on Oct. 8, 2021, which is assigned to the current assignee hereof and is incorporated herein by reference in its entirety.

FIELD OF THE DISCLOSURE

The present disclosure generally relates to transceiving data streams via an antenna in an information handling system. The present disclosure more specifically relates to tuning and correcting the operation of an antenna based on, in an open loop fashion, band aggregation and loading using radio and system telemetry of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of wireless wide area network (WWAN) (e.g., cellular), wireless local area network (WLAN) (e.g., Wi-Fi), global positioning system (GPS), and Bluetooth signals among others.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
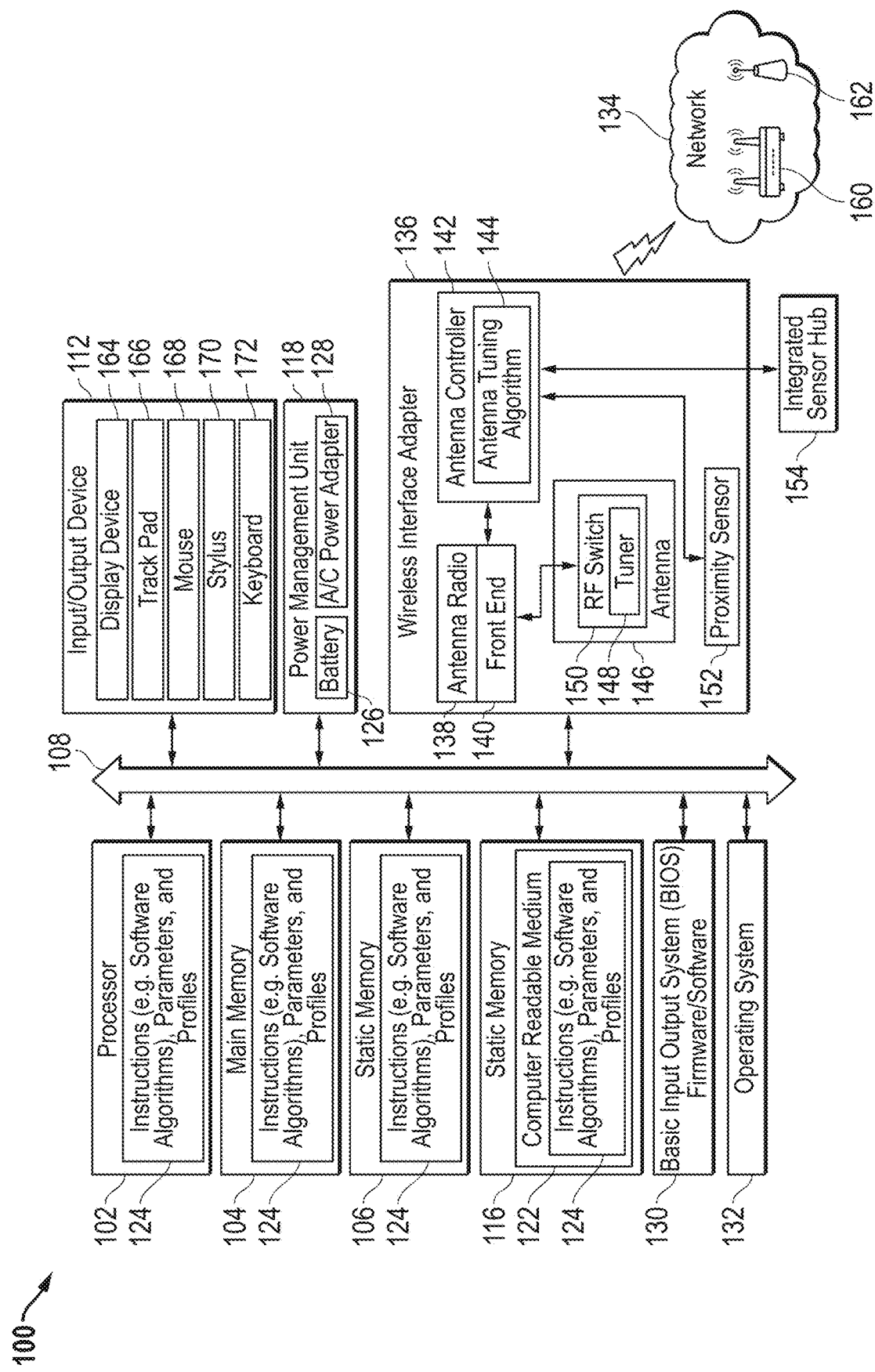
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. Information handling systems including those that are mobile in embodiments of the present disclosure address this need by employing a method of tuning antenna systems for communication via one or more wireless links operating on a variety of radio access technologies (RAT). For example, a mobile information handling system in an embodiment of the present disclosure may employ separate antenna systems for Wi-Fi signals, wireless wide area network (WWAN) signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, 5G standards such as IMT-2020, 5G NR, LTE, or WiMAX, small cell WWAN, and the like. Wi-Fi signals in embodiments of the present disclosure may include Wi-Fi6 and 6E or other future or previous Wi-Fi standards. Wi-Fi and WLAN signals in embodiments of the present disclosure may include wireless links adhering to standards such as, for example, institute of electrical and electronics engineers (IEEE) 802.11 Wi-Fi, IEEE 802.11ad 60 Ghz Wi-Fi (Wi-Gig), IEEE 802.15 wireless personal area network (WPAN), and IEEE 802.11ax-2021 (e.g., Wi-Fi 6 and 6E, 6 GHZ technologies). In other aspects, several antenna systems may be available for each radio access technology (RAT) to enable aggregated data communications such as via plural multiple in, multiple out (MIMO) streams to enhance bandwidth or reliability.

The system and method described herein, may execute an algorithm that initially determines whether a wireless connection is to be established. Where it is determined that operations of the information handling system are to implement a wireless connection, the information handling system may then determine, via a sideband communication with any wireless network, network telemetry data that includes network operating frequency bands and network frequency channels among other data. The information handling system, in an embodiment, may also initiate this sideband communication with one or more wireless networks (e.g., WWAN and WLAN networks) in order to determine characteristics of those available wireless networks such as available bandwidth, congestion statistics, throughput, available channels or bands, and operating radio frequencies, among other telemetry data obtained via this sideband communication. In an embodiment, this telemetry data may originate from a third-party who provides this data when the information handling system requests it via the sideband communication.

When this telemetry data is received by an antenna controller of the information handling system, the antenna controller may execute an antenna tuning algorithm. This antenna tuning algorithm may use that telemetry data as input to tune the antenna to transceive data at a frequency band, in an open loop fashion, commensurate with the telemetry data descriptive of the wireless link. For example, where the telemetry data indicates that an edge device is operating using a Wi-Fi6E protocol, the antenna controller may execute the algorithm and determine that the antenna is to be tuned to operate at, for example, 6 GHz. Still further, the antenna controller may receive operating characteristics associated with the operation of the information handling system. For example, in addition to the telemetry data received via the sideband communication, the antenna controller may receive data descriptive of executed applications at the information handling system as part of the operating characteristics. These executed applications, along with the telemetry data, may be used as input into the antenna tuning algorithm to tune the antenna to transceive data at a frequency band that may be suitable for low latency, high throughput, burst data transception or other wireless data needs of the executed applications. Other operating characteristics used as input into the antenna tuning algorithm may include an orientation of the information handling system and specific absorption rate (SAR) data received at one or more proximity sensors. With this data, the antenna controller may select among a plurality of antenna formed within the information handling system and select among specific frequencies in order to use a single antenna to communicate among various available frequencies.

In order to tune the antenna, the information handling system may include a frequency switch that includes a tunable resistor, inductor, or capacitor (RLC) circuit tuner in an RLC circuit fed to the antenna. In an embodiment, the antenna controller may direct a switch that includes or does not include one or more resistors, inductors, or capacitors, in series or parallel, in order to adjust the impedance, current, and power provided to the antenna to change the frequency band of emission and reception of signals. In another embodiment, the RLC circuit tuner may include a phase shift network that may adjust the directionality of a transception signal from the antenna. Further, in embodiments, one or more parasitic elements associated with the antenna(s) may be utilized to affect a frequency band for transceiving or alter directionality of the transception signal.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, tablet, dual-tablet, a desktop computer, a communications device, an access point (AP), a base station transceiver, a wireless telephone, all-in-one computing device, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices 112, such as a keyboard 172, a mouse 168, a video/graphic display device 164, a track pad 166, a stylus 170, or any combination thereof. The information handling system can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic (e.g., antenna controller 144 or an embedded controller (EC)) or some combination of the same. Any of the processing resources may operate to execute code that is either firmware or software code. Moreover, the information handling system 100 can include memory such as main memory 104, static memory 106, computer readable medium 122 storing instructions 124 of the antenna tuning algorithm 144, and drive unit 116 (volatile (e.g., random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a display device 164. The display device 164 in an embodiment may function as a liquid crystal display (LCD), an organic light emitting diode (OLED), a flat panel display, or a solid-state display. Additionally, the information handling system 100 may include an alpha numeric input device, such as a keyboard 172, and/or a cursor control device, such as a mouse 168, touchpad such as a track pad 166 or gesture or touch screen input device. In an embodiment, the information handling system 100 may include a stylus 170. The stylus 170 may be any device that is generally in the shape of a writing instrument that may actively or passively interact with either a touchscreen or the track pad 166 in order to provide input to the information handling system 100. This input may include handwriting input or graphical input during execution of, for example, a graphic design program. The present specification further contemplates that any other input/output device 112 may be included for the user to interact with the information handling system 100. The information handling system 100 can also include a disk drive unit 116 that may be magnetic, static, flash memory, or other memory type.

The network interface device shown as wireless interface adapter 136 can provide connectivity to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point and/or router used to operatively couple the information handling system 100 to a network. In a specific embodiment, the network 134 may include cellular connections via one or more service providers at a base station 162 or a wireless access point 160 (Wi-Fi or WiGig) and in some portion of certain embodiments through access ports through WWAN small cell base stations or macro-cellular wireless links. Connectivity may be via wired or wireless connection. The wireless interface adapter 136 may include one or more radio frequency (RF) subsystems with transmitter/receiver circuitry, modem circuitry, and one or more radio frequency front end circuits one or more wireless controller circuits, amplifiers, antennas 146 and other circuitry. In an embodiment, an antenna radio 138 (e.g., Wi-Fi, cellular, etc.) may be operatively coupled to a front end 140 such as a WLAN front end and a cellular front end as described herein. Each front end 140 may include one or more antenna ports used for wireless communications via multiple radio access technologies. These one or more antenna ports may allow for the operative coupling of, for example, a WLAN antenna to a WLAN antenna radio 138 and a cellular antenna to a WWAN antenna radio 138, respectively.

Each of the antenna radios 138 within the information handling system 100 may communicate using one or more wireless technology protocols. Although a single antenna radio 138 is shown in FIG. 1, any number of radios are contemplated and the principles described herein may be applied similarly in those additional radios. In the embodiments where the information handling system 100 includes a cellular antenna radio 138, this cellular antenna radio may contain individual subscriber identity module (SIM) profiles for each technology service provider and their available protocols for subscriber-based radio access technologies such as cellular LTE communications.

The wireless interface adapter 136, also known as a wireless interface device, may also include antennas 146 which may include any number of tunable antenna systems for use with the system and methods disclosed herein. In the embodiment shown in FIG. 1, the antennas 146 may include any number of antennas 146 that are operatively coupled to one or more antenna radios 138 via front end(s) 140. Additional antenna system modification circuitry (not shown) may also be included with the wireless interface adapter 136 to implement signal transmissions as described in various embodiments of the present disclosure.

In some aspects of the present disclosure, the wireless interface adapter 136 may operate two or more wireless links. In a further aspect, the wireless interface adapter 136 may operate the two or more wireless links with a single, shared communication frequency band such as with the 5G standard relating to unlicensed wireless spectrum for small cell 5G operation or for unlicensed Wi-Fi WLAN operation in an example aspect. For example, a 2.4/2.5 GHz wireless communication frequency band or 5 GHz wireless communication frequency band may be apportioned under the 5G standards for communication on either small cell WWAN wireless link operation or under Wi-Fi 802.11 standards for WLAN operation. In some embodiments, the shared, wireless communication band may be transmitted through one or a plurality of antennas 146. In a specific embodiment described herein, the shared, wireless communication band may be transmitted through a plurality of antennas used to operate in the N×N MIMO array configuration where multiple antennas 146 are used to exploit multipath propagation. Other shared communication frequency bands are contemplated for use with the embodiments of the present disclosure as well and the present specification contemplates the use of those other shared communication frequency bands. In an embodiment, the antennas 146 formed into the N×N MIMO array configuration include multiple antennas such that N is greater than 1.

In other aspects, the information handling system 100, operating as a mobile information handling system may, may operate a plurality of wireless interface adapters 136 for RF subsystem operation in one or more wireless communication bands. The plurality of wireless interface adapters 136 may further share a wireless communication band or operate in nearby wireless communication bands in some disclosed embodiments. For example, in some embodiments, some of the antennas 146 may implement harmonics, parasitic elements, or other effects may impact wireless link operation for transception band tuning or directionality adjustment when a plurality of wireless links are operating as in some of the presently described embodiments. The transmission or reception of the antenna radios 138 operates under the wireless interface adapter 136 with an antenna controller 142 to execute an antenna tuning algorithm 144 and potentially make antenna system adjustments such as to tuning or directionality according to embodiments of the present disclosure.

The wireless interface adapter 136 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. The wireless interface adapter 136 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the 2.4/25 or ~5 GHz frequency bands such as under 802.11 a/h/j/n/ac/ax. It is understood that any number of available channels may be available under the 2.4, 5-7 GHz communication frequency bands. WLAN, for example, may also operate at a 2.4 GHz band. WWAN may operate in a number of bands, some of which are proprietary but may include a wireless communication frequency band at approximately 5 GHz or 6 GHz bands for example. In additional examples, WWAN carrier licensed bands may operate at frequency bands of approximately 700 MHz, 800 MHz, 1900 MHz, or 1700/2100 MHz as well as others in the new radio frequency range 1 (NRFR1) or NFRF2 bands sub-6 GHz or greater than 6 GHz, and other known bands. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

The wireless interface adapter 136 can represent an add-in card, wireless network interface module that is integrated with a main board of the information handling system or integrated with another wireless network interface capability, or any combination thereof. In an embodiment the wireless interface adapter 136 may include one or more radio frequency subsystems including transmitters and wireless controllers for connecting via a multitude of wireless links. In an example embodiment, an information handling system 100 may have an antenna system transmitter for 5G small cell WWAN, Wi-Fi WLAN or WiGig connectivity and one or more additional antenna system transmitters for macro-cellular communication. The RF subsystems may include wireless controllers to manage authentication, connectivity, communications, power levels for transmission, buffering, error correction, baseband processing, and other functions of the wireless interface adapter 136.

In an embodiment, the wireless interface adapter 136, via instructions from the antenna controller 142, initiates a sideband communication with any network available to the information handling system. For example, the wireless interface adapter 136 may cause any front end 140 (e.g., WLAN or WWAN front end) circuitry and radio 138 with any radio subsystems to search for a network (e.g., via a wireless access point 160 or base station 162) and initiate a sideband communication with that network. In an embodiment, the wireless interface adapter 136 may additionally cause the front end 140 or radio 138 to search for any other network (e.g., via a base station 162 or wireless access point 160) and initiate a sideband communication with that other network. This sideband communication may request from a plurality of sources any telemetry data associated with the networks available to the information handling system to be operatively coupled to. In an example embodiment, the antenna controller 142 may execute and out-of-band (OOB) communication with a WLAN or WWAN network or a Wi-Fi or WWAN connection. This may establish a sideband communication with a backend management server for the information handling system such as one executing an information handling system management application such as Dell Optimizer®. In an embodiment, an OOB sideband communication may be executed by an embedded controller (EC) and conducted via a wireless link on a Wi-Fi or LTE small cell radio. In this embodiment, the information handling system management application may manage one or more information handling systems operatively coupled to the backend server. This sideband communication may access the backend server or other remote information handling system to obtain network telemetry data descriptive of, at least, network operating frequency bands and network frequency channels at those networks 134. This sideband data traffic communication telemetry data may also include other sideband communication telemetry data such as congestion data, traffic data, and data bandwidth, among other data described herein that is associated with those wireless communication channels available to the information handling system 100. In an embodiment, the backend server operating the information handling system management application (e.g., Dell Optimizer®) may be under contract with a number of service providers such as cellular service providers or internet service providers to access this sideband data traffic communication telemetry data associated with their respective services or may be managed by an enterprise that operates the WLAN or WWAN networks. For example, the backend server may have a contract or agreement with a cellular network provider to be provided with access to the sideband data traffic communication telemetry data associated with the operations of a WWAN operated by the cellular network provider or a WLAN operated by an internet service provider or enterprise, for example. In an embodiment, the sideband communication may access sources at the various networks that are operated by any party that maintains telemetry data such as the congestion data, transmission speeds, data bandwidth, frequency bandwidth, and data throughput among other data. Once received via the sideband communication, the backend server executing the information handling system management application (e.g., Dell Optimizer®) may provide this data to the information handling system 100 and the antenna controller 142 for further processing.

The antenna controller 140 may also gather data descriptive of operating characteristics associated with the operation of the information handling system information. In an embodiment, this may include data related to an application being executed on the information handling system 100 gathered from the processor 102 or other processing device. This may be referred to herein as wireless application telemetry data. The application being executed by the information handling system 100 may use the network 134 to transmit and receive data. These applications may include, for example, a music streaming application, an audio/video streaming application, a videoconferencing application, an email application, an online gaming application, among others. The execution of each of these types of applications may require more or less bandwidth, data throughput, and signal strength that may or may not be available to the information handling system 100 via a certain WLAN, WWAN, or other network connection. For example, a gaming application may require a relatively high data throughput. In this example, the antenna controller 142 may receive this data and determine which network connection would best facilitate the execution of this application based on the execution of the antenna tuning algorithm 144. Based on whether any identified network connections would better benefit the operation of the application being executed, the antenna controller 142 may execute the antenna tuning algorithm 144 to include this data as input in order to select the appropriate radio frequency (RF) to use to transmit and receive data via the antenna 146 according to the embodiments described herein. Additionally, in an embodiment, the directionality of the transception signal may be altered based on the output from the antenna tuning algorithm 144. This may be done in order to steer the transception signal towards the access point (AP) 160 or the base station transceiver 162 to increase the signal quality between the information handling system 100 and the access point (AP) 160 or the base station transceiver 162. In an embodiment, the antenna 146 may include one or more parasitic elements to affect the frequency band for transceiving signals and altering the directionality of the transception signal based on the frequency band used.

The information handling system 100 may also, via the antenna radio 138 of the wireless interface adapter 136, receive additional operating characteristic by receiving measurements describing various metrics relating to wireless communication and provide that data to operation an antenna tuning algorithm 144 as described in the present disclosure. For example, the antenna controller 142 and antenna radio 138 may manage detecting and measuring received signal strength levels, bit error rates, signal to noise ratios, latencies, jitter, and other metrics relating to signal quality and strength of any of a plurality of communication networks made available to the information handling system 100. In an embodiment, the antenna controller 142 may be operatively coupled to an integrated sensor hub 154 to detect and gather this input for the antenna tuning algorithm 144. In an embodiment, the integrated sensor hub 154 is part of a core system. In an embodiment, the integrated sensor hub 154 is integrated as a standalone subsystem in the processor 102 to run in parallel with other operations of the information handling system 100. In an example embodiment, the integrated sensor hub 154 may include any type of sensor that may detect the orientation of the information handling system 100 in order to determine whether the antennas 146 will be placed in an optimal position to send and receive data. In other embodiments, the integrated sensor hub 154 may include or be operatively coupled to a proximity sensor 152. In this embodiment, the proximity sensor 152 may detect a specific absorption rate (SAR) at each antenna 146. The SAR data detected by the proximity sensor 152 may determine whether there is an obstacle such a user's body placed by the antenna 146. This SAR data may also be provided to the antenna controller 142 to be used as input during execution of the antenna tuning algorithm 144. In an embodiment, when the proximity sensor 152 detects a change in the SAR, then a risk of radiation exposure may occur which may initiate power cutbacks in the radiating elements.

In an embodiment, the information handling system 100 may include a radio frequency (RF) switch 150. The RF switch 150 may be any device or circuitry that allows the antenna controller 142 to change the radio frequencies that are emitted and received by any one of the antennas 146. As described herein, the RF switch 150 may include a tuner 148 that includes any number or arrangement of circuit electrical components that include resistors, inductors, or capacitors, for example, arranged in series or in parallel. In an embodiment, the tuner 148 may include a resistor, inductor, capacitor (RLC) circuit with any of the RCL components is series or parallel in an antenna matching circuit. In an embodiment, the tuner 148 may include a passive circuit for tuning the antennas 146 (e.g., 1.2 picofarad (pF)) to operate at a specific RF based on the output from the execution of the antenna tuning algorithm 144 by the antenna controller 142. In another embodiment, the tuner 148 may be an active circuit that includes any variable electrical component (e.g., variable capacitor, resistor, or inductor) that allows the antenna controller 142 to tune the antennas 146 accordingly. In another embodiment, the tuner 148 may include both passive and active electrical components used to roughly tune and fine tune the antennas 146 to a specific RF.

The RF switch 150 with its tuner 148, in an embodiment, may be selectively activated by the antenna controller 142 based on the output from the execution of the antenna tuning algorithm 144. In an embodiment, this is done to set the impedance at the antennas 146 and any antenna components or parasitic element components to match with the intended radio frequency used to communicate with the edge device such as the base station 162 or wireless access point 160. For example, based on the network telemetry data and operating characteristics received by the antenna controller 142, the output from the antenna controller 142 via execution of the antenna tuning algorithm 144 may result in the antennas 146 transmitting and receiving data at 6 GHz when connected to a 6 GHz wireless access point 160 or a base station 162 operating Wi-Fi 6E or 5G protocols. As such, any of the antennas 146 formed within the information handling system 100 may be designed smaller by designing narrow-band antennas and moving the tuning across the electromagnetic spectrum by altering the impedance response of the antennas 146 via actuation of the tuner 148 to utilize any antenna components or parasitic element components in an open loop fashion. This further allows any of the antennas 146 to be placed within the information handling system 100 in unconventional locations or even co-located with a docking station for the stylus 170 without realizing a mismatch in frequency because of the alterations of the tuner 148 of the RF switch 150 by the antenna controller 142. Even further, by implementing the tuner 148 in this way, any changes in the operating characteristics of the information handling system 100 may be corrected due to the simultaneous feedback from the integrated sensor hub, proximity sensor, and data received from the sideband communications.

In an embodiment, the antenna controller 142 of the wireless interface adapter 136 may manage one or more RF subsystems to manage transmission power levels which directly affect RF subsystem power consumption as well as transmission power levels from the plurality of antennas 146. The transmission power levels from the antennas 146 may be relevant to specific absorption rate (SAR) safety limitations for transmitting mobile information handling systems. To control and measure power consumption via a radio, the radio may control and measure current and voltage power that is directed to operate one or more antennas 146. Additionally, the RF subsystems may be used to adjust the directionality or power transmission levels of the radiation patterns at each of the antennas 146 or select among antennas 146 to reduce SAR levels. Again, this power consumption may be adjusted based on the output from the antenna controller 142 upon execution of the antenna tuning algorithm 144. Additionally, or alternatively, a phase shift network (not shown) may be implemented that includes a plurality of parasitic elements to direct the electromagnetic patterns at the antennas 146 towards the edge device (e.g., base station 162 or wireless access point 160), in some embodiments.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device 164, power transformers or battery, radio systems, or other input/output devices 112, and other components that may require power when a power button has been actuated by a user. In an embodiment, the PMU 118 may be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more application programs, and basic input/output system (BIOS) firmware/software 130. BIOS firmware/software 130 functions to initialize information handling system 100 on power up, to launch an OS 132, and to manage input and output interactions between the OS 132 and the other elements of information handling system 100. Again, the antennal controller 142 may also gather information related to the application being executed on the information handling system and which use the network to transmit and receive data via any given wireless links described herein. The BIOS can operate with an (EC) and firmware to conduct OOB communications with the Dell Optimizer® for sideband communications according to various embodiments herein and in connection with the antenna controller 142. In a particular embodiment, BIOS firmware/software 130 resides in memory 104, and include machine-executable code that is executed by processor 102 to perform various functions of information handling system 100 as described herein. In another embodiment (not illustrated), application programs and BIOS firmware/software 130 reside in another storage medium of information handling system 100. For example, application programs and BIOS firmware/software 130 can reside in drive 116, in a ROM (not illustrated) associated with information handling system 100, in an option-ROM (not illustrated) associated with various devices of information handling system 100, in a storage system (not illustrated) associated with network channel of a wireless interface adapter 136, in another storage medium of information handling system 100, or a combination thereof. Application programs 124 and BIOS firmware/software 130 can each be implemented as single programs, or as separate programs carrying out the various features as described herein.

During operation of the information handling system 100, the antenna controller 142 may communicate with the processor 102 or an EC to establish a sideband communication with one or more networks 134. As described herein, this sideband communication is established in order to request and receive, network telemetry data descriptive of, at least, network operating frequency bands and network frequency channels. Sideband may be a wireless (e.g., WLAN) communication out of band with a backend information handling system (e.g., backend server) or network 134. This data may be received at an antenna radio 138 and passed to the antenna controller 142.

As described herein, the network telemetry data may be accessed by the information handling system 100 accessing a backend server. In an embodiment, this backend server may be executing an optimizing service such as Dell Optimizer®. The optimizing service may operatively couple to one or more WLAN and cellular network service providers including private enterprise wireless networks. These WLAN and cellular network service providers may provide the optimizing service with, at least, the network operating frequency bands and network frequency channels used to access a network 134. In an embodiment, the WLAN and cellular network service providers may be contractually engaged with or otherwise provide to the optimizing service to provide this network telemetry data. As described herein, additional network telemetry data may be retrieved from the WLAN and cellular network service providers such as available data bandwidth on the networks, congestion statistics on the networks, data throughput, and signal strength, among others. The frequency of establishing this sideband communication link between the information handling system 100 and the edge devices (e.g., base station 162 or wireless access point 160) may be any period of time or may be continually. In an embodiment, the sideband communication link may be established if and when any operating characteristics associated with the operation of the information handling system have changed.

Also, during operation, the information handling system 100 may request and receive operating characteristics associated with the operation of the information handling system. In an embodiment, the operating characteristics may include an orientation of the information handling system 100 that may be a convertible information handling system, such as a convertible 360° type information handling system including a convertible laptop or dual-screen platform computing device. In an embodiment, the orientation of the information handling system 100 may include a tablet configuration, a dual tablet configuration, a laptop configuration, a tent mode configuration, a book configuration, among others. In the context of the information handling system 100 being a 360-degree-type laptop, a number of sensors operatively coupled to the integrated sensor hub 154 may be used to determine the orientation the information handling system 100. These variety of sensors may include, for example, a hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. In the embodiment, where an orientation sensor is used, a plurality of orientation sensors may be used to reference direction such as "up" or "north" in order to determine the orientation of the information handling system 100. In an example embodiment, a hall effect sensor may be placed at any location within the chassis of the information handling system 100 to detect the position of the individual parts of the information handling system 100 relative to each other. In a specific embodiment where the information handling system 100 is a laptop-type information handling system 100, the hall effect sensor may be placed in one or more of a display portion or base portions of the information handling system 100. In this embodiment, the hall effect sensor, in combination with any orientation sensor, gyroscope, and/or accelerometer, may detect when the display portion is moved away from a top surface of a based portion, a relative position of the display portion to the base portion, and/or when a back side of the display portion is placed against a bottom portion of the base portion of the information handling system 100. As described herein, this allows the hall effect sensor and other sensors to detect whether the laptop-type information handling system 100 is placed in a tablet configuration, a dual tablet configuration, a laptop configuration, a tent mode configuration, a book configuration, as well as several other configurations described herein. The hall effect sensor and other sensors may be similarly used in a dual screen-type information handling system 100 in order to detect the relative positions of each of the screens. Again, any data obtained by the hall effect sensor and other sensors is presented to the antenna controller 142 for the antenna controller 142 to interpret and provide that orientation data as input to the antenna tuning algorithm 144 as described herein. This orientation data may be used as input to the antenna tuning algorithm 144 may be used for tuning the frequency band at the antenna 146 as well as to adjust the directionality of the transmission signals at the antenna 144.

In an embodiment, a magnetometer may operate as an orientation sensor and may be used to measure the earth's magnetic field at any location in order to detect an orientation of the information handling system 100 relative to that magnetic field. In a specific embodiment, the magnetometer may be a three-axis magnetometer that eliminates the sensitivity to the way in which the information handling system 100 is held or positioned. Similarly, a gyroscope sensor may be used to measure any changes in direction along an x-axis, a y-axis, and a z-axis according to a Cartesian coordinate system. Again, any data obtained by the magnetometer is presented to the antenna controller 142 for the antenna controller to use as input to the antenna tuning algorithm 144 being executed at the antenna controller 142. Again, this orientation data may be used as input to the antenna tuning algorithm 144 may be used for tuning the frequency band at the antenna 146 as well as to adjust the directionality of the transmission signals at the antenna 144.

In an embodiment, the antenna controller 142 may receive SAR data from an integrated sensor hub 154 or one or more proximity sensors 152. In this embodiment, the proximity sensor 152 may detect a specific absorption rate (SAR) at each antenna 146. The SAR data detected by the proximity sensor 152 may determine whether there is an obstacle such a user's body placed between the antenna 146 and a wireless access point 160 or base station 162. This SAR data may also be provided to the antenna controller 142 to be used as input during execution of the antenna tuning algorithm 144 by the antenna controller 142.

When the antenna controller 142 receives the network telemetry data and operating characteristics, the antenna controller 142 may execute the antenna tuning algorithm 144 used to determine whether or not to issue instructions to the RF switch 150 including a tuner 148 (e.g., resistor, inductor, and capacitor (RLC) circuit tuner) at the antennas 146 to tune the antennas 146 to transceive data at a frequency band or to change the directionality of the transmission signals, in an open loop fashion, commensurate with the telemetry data descriptive of the wireless link. In an embodiment, the antenna tuning algorithm 144 may be in the form of a look-up table. An example look-up table is as follows in Table 1:

TABLE 1

| Trigger | Source | First Antenna | Second Antenna |
|---|---|---|---|
| Band (Wi-Fi 6) | Network Telemetry Data | Tune State 0 | Tune State 0 |
| Band (Wi-Fi 6E) | | Tune State 1 | Tune State 1 |
| Proximity-Wi-Fi 6 | Proximity Sensor and Network Telemetry Data | Tune State 2 | Tune State 1 |
| Proximity-Wi-Fi 6E | | Tune State 1 | Tune State 2 |
| Stylus attached, Wi-Fi-6 | Integrated Sensor Hub Data and Network Telemetry Data | Tune State 0 | Tune State 1 |
| Lid Closed, Wi-Fi 6E | | Tune State 3 | Tune State 3 |

Table 1 shows that, in this example, embodiment, one or more antenna radios 138 are operatively coupled to two individual antennas via a front end 140. In this embodiment, the front end 140 may have two ports to provide this coupling. However, although this table shows only two antennas are present, the present specification contemplates that the number of ports at the front end 140 and the number of antennas 146 may be more or less than two. In an embodiment, the two antennas may be individually tuned to cause each antenna to operate at the same frequency. Because of the location of the antennas within the information handling system 100, the network telemetry data, and the operating characteristics for each antenna 146 may be different at any given time, the tuning characteristics used by the antenna controller 142 to tune these antennas 146 via the RF switch 150 and its tuner 148 may be different. However, when these two antennas 146 are tuned to operate at the same or similar frequency bands (e.g., 2.4 GHz, 5 GHz, 6 GHz, etc.) they may operate in a MIMO configuration thereby increasing the data throughput to and from the information handling system 100. In another embodiment, each of the antennas 146 may be tuned to operate at a different frequency in order to allow the information handling system 100 to be operatively coupled to two different networks 134.

Table 1 shows a first column with a list of triggers that help to influence the frequency at which each antenna 146 is tuned to. As described herein, the antenna controller 142 may initiate the sideband communication in order to retrieve network telemetry data as described in the second column "Source" indicating the source of this network telemetry data (e.g., network telemetry data form the radio initiating the sideband communication). Among this network telemetry data is data descriptive of network operating frequency bands and network frequency channels at each available network 134. If, as in row three of the Table 1, a network is present that operates using the Wi-Fi 6E protocol, this may trigger the antenna controller 142 to access the RF switch 150 to tune, via the tuner 148, each antenna 146 in order to cause each antenna 146 to operate at a Wi-Fi 6E frequency that includes frequencies between 1 and 7.125 GHz (typically at 6 GHz). However, where the higher frequencies are available, the antennas 146 may be tuned to those higher frequencies in order to increase the data transmission and reception characteristics and capabilities of the information handling system 100.

Table 1 also shows tune states of the first antenna and the second antenna. Continuing with the example embodiment in row 2 of table 1, the tune state of the first antenna may be "tune state 1" and the tune state of the second antenna is "tune state 1." These tune states (e.g., "0," "1," "2," and "3") may indicate to the antenna controller 142 how to cause the RF switch 150 to tune each of the antennas 146. As described herein, the RF switch 150 may include any switch that may operatively couple the front end 140 to each of the antennas 146 via a specific RLC circuit in the tuner 148 or to set the directionality of the antenna lobes of the transmission signals. By including or excluding certain RLC circuits in a bank of RLC circuits or components, the RF switch 150 may switch from one passive tuner 148 to another in order to achieve a specific tune state at those antennas 146 so that the antennas 146 may operate at a specific frequency as described herein. In another embodiment, the tuner 148 may include a number of active circuits such as a variable resistor, inductor, and/or capacitor used to actively change the impedance at each of the antennas 146 in order to cause the antennas 146 to operate at a specific frequency. In another embodiment, both active and passive elements may be included within the tuner 148 so that rough and fine tuning of the antennas 146 may be achieved in order to cause the antennas 146 to operate not only within a specific frequency band but also at a specific channel within that frequency band. The tuning may then invoke portions of the antenna or parasitic elements to resonate and transceive at a specific frequency band. Further, a phase shift adjustment and/or parasitic elements may be used to alter lobe directionality of the antennas for particular tune states.

Table 1 also shows additional triggers that influence how the antenna controller 142, via the RF switch 150 and tuner 148, adjusts the operating frequencies of the antennas 146. As described herein, the information handling system 100 may include one or more proximity sensors 152 that detect the presence of a user's body or, for example, a stylus 170 near any one of the antennas 146. Because the electromagnetic radiation (ER) at the antennas 146 can be absorbed by the user's hand and the stylus 170, the proximity sensor 152 may detect a SAR value and provide this SAR data to the antenna controller 142 for appropriate tuning of the antennas 146 accordingly. For example, in row four of table 1, the trigger from the network telemetry data indicates that the antennas 146 are to operate as Wi-Fi 6 antennas while the source data from the proximity sensor 152 and the network telemetry data indicate that the first antenna should be tuned at a tune state of 2 while the second antenna indicates that it should be tuned to a tune state of 1. In this example, the SAR data from the proximity sensor 152 may have indicated that at the first antenna there are some EM absorption or detuning due to the presence of the user's body or the stylus 170. In the case where the stylus 170 is present, the antenna controller 142 may have confirmed the presence of the stylus 170 from data obtained at the integrated sensor hub 154 (e.g., location sensor within the stylus 170 indicates its location relative to the information handling system 100). In some embodiments, the stylus 170 may be docked at docking station formed in the information handling system 100 and the first antenna 146 may be formed into the chassis of the information handling system 100 at or close to that docking station. Whatever the case may be, the first antenna and second antenna may be individually tuned so that each of the antennas 146 operate at the frequency channel and band tuned for the Wi-Fi access point 160 being accessed. In order to tune each individual antenna 146, each antenna may be operatively coupled to the front end 140 via an individual tuner 148 that includes passive, active, or both passive and active RLC circuits as described herein. In an embodiment, each of the antennas 146 may also include an RF switch 150 that may be allowed to switch from one passive RLC circuit of the tuner 148 to another in order to roughly tune the individual antennas 146 to a specific frequency band. Additionally, the RF switch 150 with its tuner 148 may be used to adjust the directionality of the transceiving signals as described herein.

In an embodiment, as described in table 1 at row 7 for example, the orientation of the information handling system 100 may also be considered when tuning the antennas 146 to a specific operating frequency. In this example in row 7, the orientation of the information handling system 100 indicates that the lid is closed. Here, for example, the information handling system 100 may be a laptop-type information handling system 100 where the lid or display housing is closed against the base portion of the information handling system 100. This orientation may be detected by the integrated sensor hub 154 using a number of different sensors described herein such as hall effect sensors. This orientation data is relayed to the antenna controller 142 and used as input to the antenna tuning algorithm 144, and based on the example scenarios in table 1, to adjust the operating frequencies of the antennas 146 accordingly in order to achieve the highest data throughput at the specific orientation of the information handling system 100. Additionally, the data received from the integrated sensor hub 154 and used as input into the antenna tuning algorithm 144 may be used to adjust the directionality of the transceiving signals as described herein.

In an embodiment, the tuning of each of the antennas 146 may be set until new network telemetry data or operating characteristics are provided to the antenna controller 142 that indicate a change in tuning is necessary in order to sustain communications with an edge device (e.g., a base station 162 or a wireless access point 160). As this data changes, the tuning states and operating frequencies may also change. The frequency as to when the network telemetry data and operating characteristics is provided to the antenna controller 142 may vary and the present specification contemplates any frequency of updates of this data.

In an embodiment, an optimizing service such as a Dell Optimizer® service may be installed on the information handling system to survey applications being executed to determine each applications' wireless connection needs in order to meet certain data bandwidth needs of those applications. As described herein, the quality of service for the application is considered during execution of the antenna tuning algorithm 164 by the antenna controller 142 and is used as input, along with the sideband communication with the networks 134 or congestion of these networks 134, to the antenna tuning algorithm 164. In this embodiment, this information may be listed in the look-up table, table 1, along with the other data described herein.

In an embodiment, the wireless network 134 may have a wireless mesh architecture in accordance with mesh networks described by the wireless data communications standards or similar standards in some embodiments but not necessarily in all embodiments. The wireless interface adapter 136 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. For example, code instructions of an antenna tuning algorithm 164 may be executed in whole or in part by the antenna controller 142 or an EC in an embodiment. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 134 can communicate voice, video or data over the network 134. Further, the instructions 124 may be transmitted or received over the network 134 via the network interface device or wireless interface adapter 136.

The wireless interface adapter 136 represents a network interface controller (NIC) disposed within information handling system 100, on a wireless adapter card, on a main circuit board of the information handling system, integrated onto another component such as processor 102, in another suitable location, or a combination thereof. The wireless interface adapter 136 can include another information handling system, a data storage system, another network, a grid management system, another suitable resource, or a combination thereof. The wireless interface adapter 136, in an embodiment, may operably connect to a network 134. Connection to network 134 may be wired or wireless.

The network interface device shown as wireless interface adapter 136 can provide connectivity to a network 134, such as a wide area network (WAN), a local area network (LAN), wireless local area network (WLAN), a wireless personal area network (WPAN), a wireless wide area network (WWAN), or other network. Connectivity may be via wired or wireless connection. The wireless interface adapter 136 may include an adaptive massive MIMO multiplexer with transmitter/receiver circuitry such as antenna radio 138, wireless controller circuitry such as antenna controller 142, amplifiers and other circuitry for wireless communications. The wireless interface adapter 136 may also include antennas 146 which may be tunable antenna systems for use with the system and methods disclosed herein. The antenna controller 142 may also include wireless controllers to manage authentication, connectivity, communications, power levels for transmission, buffering, error correction, baseband processing, and other functions of the wireless interface adapter 136.

The information handling system 100 can include a set of instructions 124 that can be executed to cause the computer system to execute various software or hardware applications or to perform any one or more of the methods or computer-based functions disclosed herein. For example, instructions 124 may execute software agents or other aspects or components of multiple types of applications with varying data service requirements including streaming applications, gaming applications, virtual applications, or other applications that may interfere with the wireless interface adapter 136 for wireless data communications. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 142 to perform the processes described herein. Similarly, main memory 104 and static memory 106 may also contain a computer-readable medium for storage of one or more sets of instructions, parameters, or profiles 124 including one or more software applications, or all or a portion of the antenna tuning algorithms 164. The disk drive unit 116 and static memory 106 also contain space for data storage. Further, the instructions 124 may embody one or more of the methods or logic as described herein. For example, instructions relating to the tuning of the antennas 146 as described herein may be stored here. In a particular embodiment, the instructions, parameters, and profiles 124 may reside completely, or at least partially, within the main memory 104, the static memory 106, and/or within the disk drive 116 during execution by the processor 102 of information handling system 100. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
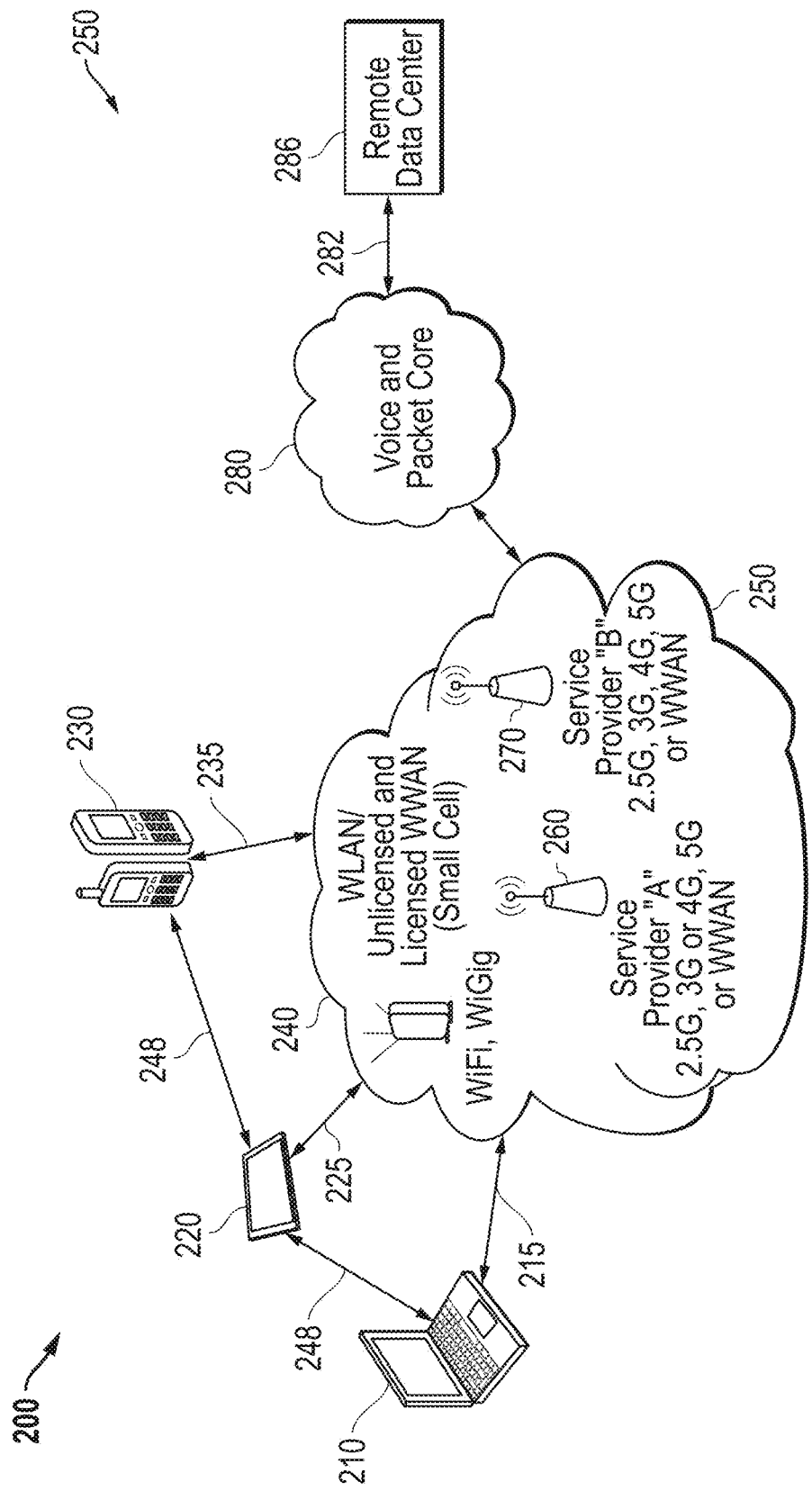
FIG. 2 is a block diagram of a network environment offering several communication protocol options and mobile information handling systems according to an embodiment of the present disclosure.

FIG. 2 illustrates a network 200 that can include one or more information handling systems 210, 220, 230. The information handling systems 210, 220, 230 shown in FIG. 2 may be similar to the information handling system 100 described in connection with FIG. 1. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 220, 230 may be a laptop computer, tablet computer, 360-degree Convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G or other small cell WWAN communications such as gNodeB, eNodeB, or similar wireless network protocols and access points. Alternatively, other available wireless links within network 200 may include macro-cellular connections 250 via one or more service provider base stations 260 and 270. As described herein, a plurality of antennas may be operatively coupled to any of the macro-cellular connections 250 via one or more service provider base stations 260 and 270 or to the wireless local area networks (WLANs) selectively based on the SAR data, configuration data, and network telemetry data associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards and may variously include WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. It is understood that any number of available channels may be available under the operating communication frequency band for WLAN access points. WWAN may operate in a number of bands, some of which are proprietary but may include a wireless communication frequency band at approximately 2.5 GHz or 5 GHz bands for example. In the example embodiment, mobile information handling systems 210, 220, and 230 include both unlicensed wireless RF communication capabilities as well as licensed wireless RF communication capabilities due to the capabilities of the antennas (e.g., 146 in FIG. 1) described herein. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band. Either licensed or unlicensed spectrum for wireless networks in WLAN or WWAN may be administered and managed by service providers or a private entity or enterprise.

An enterprise may also implement an information handling system management system, such as Dell Optimizer®, to manage client information handling systems such as the information handling systems 210, 220, 230 described in FIG. 2. This information handling system management system may interface or collect data from administered wireless WLAN or WWAN on a remote or edge-based server at the remote data center 286 in part and in part on one or more managed client information handling system 210, 220, 230. The information handling management system may execute code instructions via an EC or other processor on the managed information handling system 210, 220, 230 and at a remote location to conduct OOB communications to exchange sideband data for antenna control according to the embodiments herein.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands or plural wireless protocols according to embodiments of the present disclosure. Example competing protocols may be local wireless network access protocols such as Wi-Fi/WLAN, WiGig, and small cell WWAN in an unlicensed, shared communication frequency band. Within local portion of wireless network 250 access points for Wi-Fi or WiGig as well as small cell WWAN connectivity may be available. This may create situations where a plurality of antenna systems are operating on a mobile information handling system 210, 220 or 230 via communication wireless links on both WLAN and WWAN and which may operate within the same, adjacent, or otherwise interfering communication frequency bands. The antenna or antennas may be transmitting antennas that include high-band, medium-band, low-band, and unlicensed band transmitting antennas in embodiments herein. The antennas may cooperate with other antennas in a N×N MIMO array configuration according to the embodiments described herein. Alternatively, embodiments may include a single transceiving antenna capable of receiving and transmitting, and/or more than one transceiving antennas. Each of the antennas included in the information handling system 100 in an embodiment may be subject to the FCC regulations on specific absorption rate (SAR). These multiple antennas, SAR data detecting a user, peripherals such as a stylus, information handling system configuration, and other factors may contribute to detuning the one or more antennas.

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200. In an embodiment, the remote data center 286 may include the optimizing service such as Dell Optimizer® used to provide the antenna controllers of the individual information handling systems 210, 220, 230 with the network telemetry data as described herein. The optimizing service may operatively couple to one or more internet and cellular network service providers. These internet and cellular network service providers may provide the optimizing service with, at least, the network operating frequency bands and network frequency channels used to access a network.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through WWAN small cell base stations such as in network 240 or through a service provider base station tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

As described herein, the information handling systems 210, 220, and 230 may communicate with a wireless local network 240 and a WWAN small cell base stations or macro-cellular network 250 using the antennas within each of the information handling systems 210, 220, and 230. For example, each of the information handling systems 210, 220, and 230 may be similar to the information handling system described in connection with FIG. 1 with more than one antenna associated with a WLAN front end and more than one antenna associated with the cellular front end. The association of those antennas may be dynamically associated/disassociated with tuned/adjusted, or operatively coupled to the Wi-Fi front end and radio module if and when the antenna controller determines that, based on network telemetry data from the sideband communications with wireless network systems, the wireless application telemetry data from the processor and Dell Optimizer® service, indicates that the antennas should be tuned according to the methods described herein. In a first antenna association, these multiple antennas may be used to create a 2×2 or 4×4 MIMO radio transmissions from the WLAN radio and front end depending on the number of available WLAN antennas. Again, any chosen arrangement may be based on the execution of the antenna tuning algorithm by the antenna controller as described including tuning or directionality adjustment to individual antennas. In this arrangement, the information handling systems 210, 220, and 230 may communicate with the macro-cellular networks 250 using the 5G standards. Additionally, in embodiments described herein, the information handling systems 210, 220, and 230 may communicate with the wireless local network 240 at a 2.4 GHz, at 5 GHz, or at new 6 GHz (802.11ax IEEE standards) frequencies.

Figure 3:
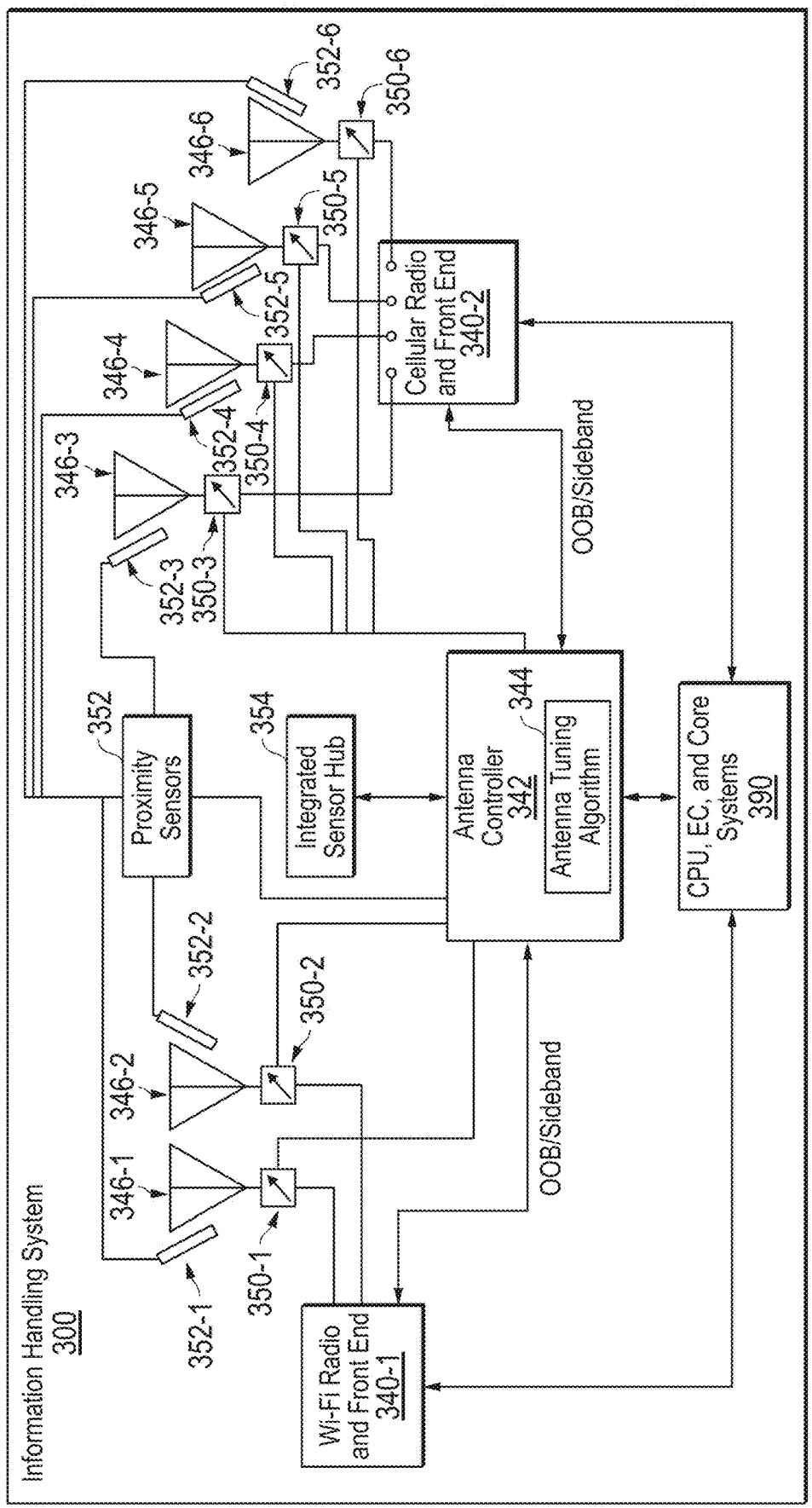
FIG. 3 is a block diagram illustrating an information handling system including radio and antenna systems according to another embodiment of the present disclosure.

FIG. 3 is a block diagram illustrating an information handling system 300 including radios 340-1, 340-2 with plural, operatively coupled antennas systems according to another embodiment of the present disclosure. In this embodiment, the information handling system 300 may include six antennas, two WLAN antennas 346-1, 346-2 operatively coupled to a Wi-Fi radio and front end 340-1 and four WWAN antennas 346-3, 346-4, 346-5, 346-6 operatively coupled to a cellular radio and front end 340-2. The arrangement of the WWAN antennas 346-3, 346-4, 346-5, 346-6 to the cellular radio and front end 340-2 and the WLAN antennas 346-1, 346-2 to the Wi-Fi radio and front end 340-1 may be similar to the antenna and radio/front end (e.g., 146 and 138.140 in FIG. 1) as described and shown in FIG. 1.

In the example embodiment shown in FIG. 3, each antenna may be operatively coupled to their respective radios and front ends 340-1, 340-2 via a tuner 350-1, 350-2, 350-3, 350-4, 350-5, 350-6. Although not shown, the present embodiments contemplates that an RF switch (not shown) may also be included similar to that described in connection with FIG. 1 (e.g., 150, FIG. 1). Each of the tuners 350-1, 350-2, 350-3, 350-4, 350-5, 350-6 include any number or arrangement of circuit electrical components that include resistor, inductors, or capacitors, for example, arranged in series or in parallel. In an embodiment, the tuners 350-1, 350-2, 350-3, 350-4, 350-5, 350-6 may include one or more series or parallel RLC circuits that may be selectable or have adjustable components. In an embodiment, the tuners 350-1, 350-2, 350-3, 350-4, 350-5, 350-6 may include one or more selectable passive circuits for tuning the WWAN antennas 346-3, 346-4, 346-5, 346-6 and WLAN antennas 346-1, 346-2 (e.g., 1.2 pF) to operate at a specific RF based on the output from the execution of the antenna tuning algorithm 344 by the antenna controller 342. In another embodiment, the tuners 350-1, 350-2, 350-3, 350-4, 350-5, 350-6 may be an active circuit that includes any variable electrical component (e.g., variable capacitor, resistor, inductor) that allows the antenna controller 342 to tune the antennas 346 accordingly. In another embodiment, the tuners 350-1, 350-2, 350-3, 350-4, 350-5, 350-6 may include both passive and active electrical components used to roughly tune and fine tune the WWAN antennas 346-3, 346-4, 346-5, 346-6 and WLAN antennas 346-1, 346-2 to operate at a specific RF. As shown in FIG. 3, the antenna controller 342 is operatively coupled to each tuner 350-1, 350-2, 350-3, 350-4, 350-5, 350-6 so that the appropriate signals are sent to these tuners 350-1, 350-2, 350-3, 350-4, 350-5, 350-6 in order to adjust impedance values at the WLAN antennas 346-1, 346-2 and WWAN antennas 346-3, 346-4, 346-5, 346-6, individually, to cause them to operate at a specific RF. This may work with a compact antenna structure housing one or more resonant parasitic, aperture, monopole, or other elements to provide flexibility tunable WLAN antennas 346-1, 346-2 and WWAN antennas 346-3, 346-4, 346-5, 346-6 or tuners 350-1, 350-2, 350-3, 350-4, 350-5, 350-6.

During operation of the information handling system 300, the antenna controller 342 may communicate with the processor to cause a sideband communication (e.g., out of band (OOB) communication) to be established with one or more radios. In an embodiment, the sideband communication may be established an out-of-band (OOB), via an OOB Wi-Fi radio, with an information handling system management system. As described herein, this sideband and OOB communication is established in some embodiments via an information handling system management system (e.g., Dell Optimizer®) in order to request and receive, network telemetry data descriptive of, at least, network operating frequency bands and network frequency channels. In an embodiment, optimizing service may operatively couple to one or more internet and cellular network service providers to receive network operating frequency bands and network frequency channels used to access a network. This data may be received at one of the cellular radio and front end 340-2 and Wi-Fi radio and front end 340-1 and passed to the antenna controller 342.

As described herein, the network telemetry data may be accessed by the information handling system 300 accessing a backend server via OOB or other wireless link. In an embodiment, this backend server may be executing an optimizing service such as Dell Optimizer®. The optimizing service may operatively couple to one or more internet and cellular network service providers. These internet and cellular network service providers may provide the optimizing service with, at least, the network operating frequency bands and network frequency channels used to access a network. In an embodiment, internet and cellular network service providers may be contractually engaged with the optimizing service to provide this network telemetry data. As described herein, additional network telemetry data may be retrieved from the internet and cellular network service providers such as available data bandwidth on the networks, congestion statistics on the networks, data throughput, and signal strength, among others. In other embodiments, the network may be privately administered (e.g., by an enterprise) such that the Dell Organizer® may access frequency bands, congestion and other data from network administration systems. The frequency of establishing this sideband communication link between the information handling system 300 and the edge devices (e.g., base station or wireless access point) may be any period of time or may be continually. In an embodiment, the sideband communication link may be established if and when any operating characteristics associated with the operation of the information handling system have changed. In the case of the example embodiment shown in FIG. 3, both the Wi-Fi radio and front end 340-1 and cellular radio and front end 340-2 may engage in this process and provide the relevant network telemetry data to the antenna controller 342.

Also, during operation, the information handling system 300 may request and receive operating characteristics associated with the operation of the information handling system. In an embodiment, the operating characteristics may include an orientation of the information handling system 300. In an embodiment, the orientation of the information handling system 300 may include a tablet configuration, a dual tablet configuration, a laptop configuration, a tent mode configuration, a book configuration, among others. In the context of the information handling system 300 being a 360-degree-type laptop, a number of sensors operatively coupled to the integrated sensor hub 354 may be used to determine the orientation the information handling system 300. These variety of sensors may include, for example, a hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. In the embodiment, where an orientation sensor is used, a plurality of orientation sensors may be used to reference direction such as "up" or "north" in order to determine the orientation of the information handling system 300. In an example embodiment, a hall effect sensor may be placed at any location within the chassis of the information handling system 300 to detect the position of the individual parts of the information handling system 300 relative to each other. In a specific embodiment where the information handling system 300 is a laptop-type information handling system 300, the hall effect sensor may be placed in one or more of a display portion or base portions of the information handling system 300. In this embodiment, the hall effect sensor, in combination with any orientation sensor, gyroscope, and/or accelerometer, may detect when the display portion is moved away from a top surface of a based portion, a relative position of the display portion to the base portion, and/or when a back side of the display portion is placed against a bottom portion of the base portion of the information handling system 300. As described herein, this allows the hall effect sensor and other sensors to detect whether the laptop-type information handling system 300 is placed in a tablet configuration, a dual tablet configuration, a laptop configuration, a tent mode configuration, a book configuration, as well as several other configurations described herein. The hall effect sensor and other sensors may be similarly used in a dual screen-type information handling system 300 in order to detect the relative positions of each of the screens. Again, any data obtained by the hall effect sensor and other sensors is presented to the antenna controller 342 for the antenna controller 342 to interpret and provide that orientation data as input to the antenna tuning algorithm 344 as described herein.

In an embodiment, a magnetometer may operate as an orientation sensor and may be used to measure the earth's magnetic field at any location in order to detect an orientation of the information handling system 300 relative to that magnetic field. In a specific embodiment, the magnetometer may be a three-axis magnetometer that eliminates the sensitivity to the way in which the information handling system 300 is held or positioned. Similarly, a gyroscope sensor may be used to measure any changes in direction along an x-axis, a y-axis, and a z-axis according to a Cartesian coordinate system. Again, any data obtained by the magnetometer is presented to the antenna controller 342 for the antenna controller to use as input to the antenna tuning algorithm 344 being executed at the antenna controller 342.

In an embodiment, the operating characteristics may further include wireless application telemetry data descriptive of resource requirements associated with the execution of a software application by the information handling system 300. This application telemetry data may include data that describes operating application needs, Wi-Fi availability, data bandwidth available, signal quality, and data congestion on the WLAN or WWAN networks to facilitate the operation of the executed application. For example, where an online gaming application is being executed by a processing device of the information handling system 300, the bandwidth requirements with a low latency may be required and this data is included as part of the operating characteristics as application telemetry data. Where, for example, the application being executed by a processing device of the information handling system 300 is an email application, latency and bandwidth may not be in issue as email may be sent and received in bursts thereby also creating application telemetry data describing these other application requirements.

In an embodiment, the antenna controller 342 may receive SAR data from an integrated sensor hub 354 or one or more proximity sensor elements 352-1, 352-2, 352-3, 352-4, 352-5, 352-6 operatively coupled to a proximity sensor 352. In this embodiment, the proximity sensor elements 352-1, 352-2, 352-3, 352-4, 352-5, 352-6 may detect a specific absorption rate (SAR) at each of the WLAN antennas 346-1, 346-2 and WWAN antennas 346-3, 346-4, 346-5, 346-6. The SAR data detected by the proximity sensors 352-1, 352-2, 352-3, 352-4, 352-5, 352-6 may determine whether there is an obstacle such a user's body or a stylus is placed by any one of the antennas 346-1, 346-2, 346-3, 346-4, 346-5, 346-6. This SAR data may also be provided to the antenna controller 342 to be used as input during execution of the antenna tuning algorithm 344 by the antenna controller 342.

When the antenna controller 342 receives the network telemetry data and operating characteristics, the antenna controller 342 may execute the antenna tuning algorithm 344 used to determine whether or not to issue instructions to one or more of the tuners 350-1, 350-2, 350-3, 350-4, 350-5, 350-6 at the antennas 346-1, 346-2, 346-3, 346-4, 346-5, 346-6 to tune the antennas to transceive data at a frequency band, in an open loop fashion, commensurate with the telemetry data descriptive of the wireless link. In an embodiment, the antenna tuning algorithm 344 may be in the form of a look-up table. An example look-up table is shown in Table 1:

Each of the antennas 346-1, 346-2, 346-3, 346-4, 346-5, 346-6 may be operated and tuned, via their respective tuners 350-1, 350-2, 350-3, 350-4, 350-5, 350-6, according to the example scenarios shown in Table 1. Although Table 1 only shows tune states associated with two antennas, the present specification contemplates that any number of antennas may also be assigned a specific tune state (e.g., "0," "1," "2," and "3") based on the received operating characteristics and network telemetry data. In the embodiment shown in FIG. 3, the WLAN antennas 346-1, 346-2 and WWAN antennas 346-3, 346-4, 346-5, 346-6 may each operate under a N×N MIMO arrangement in order to increase the data throughput at the RF each antenna 346-1, 346-2, 346-3, 346-4, 346-5, 346-6 is tuned to. Similar to the description of FIG. 1, each individual antenna 346-1, 346-2, 346-3, 346-4, 346-5, 346-6 or group of antennas may be tuned to a different frequency to allow the information handling system 300 to communicate with multiple networks.

In an embodiment, the tune states (e.g., "0," "1," "2," and "3") described in Table 1 may describe how the antenna controller 342 causes the RF switch to tune each of the antennas 346-1, 346-2, 346-3, 346-4, 346-5, 346-6. As described herein, an RF switch may include any switch that may operatively couple any of the Wi-Fi radio and front end 340-1 or cellular radio and front end 340-2 to each of the antennas 346-1, 346-2, 346-3, 346-4, 346-5, 346-6 via a specific RLC circuit in the tuner 350-1, 350-2, 350-3, 350-4, 350-5, 350-6 or to set the directionality of the antenna lobes of the transmission signals. By including or excluding certain RLC circuits in a bank of RLC circuits or components, the RF switch may switch from one passive tuner 350-1, 350-2, 350-3, 350-4, 350-5, 350-6 to another in order to achieve a specific tune state at those antennas 346-1, 346-2, 346-3, 346-4, 346-5, 346-6 so that the antennas 346-1, 346-2, 346-3, 346-4, 346-5, 346-6 may operate at a specific frequency as described herein. Thus, in an embodiment, a "tune state" may be defined as a selection or deselection of an RLC circuit or component of an RLC circuit made to cause the antennas 346-1, 346-2, 346-3, 346-4, 346-5, 346-6 to operate at a specific frequency. In another embodiment, the tuner 350-1, 350-2, 350-3, 350-4, 350-5, 350-6 may include a number of active circuits such as a variable resistor, inductor, and/or capacitor used to actively change the impedance at each of the antennas 346-1, 346-2, 346-3, 346-4, 346-5, 346-6 in order to cause the antennas 346-1, 346-2, 346-3, 346-4, 346-5, 346-6 to operate at a specific frequency. In another embodiment, both active and passive elements may be included within the tuner 350-1, 350-2, 350-3, 350-4, 350-5, 350-6 so that rough and fine tuning of the antennas 346-1, 346-2, 346-3, 346-4, 346-5, 346-6 may be achieved in order to cause the antennas 346-1, 346-2, 346-3, 346-4, 346-5, 346-6 to operate not only within a specific frequency band but also at a specific channel within that frequency band. The tuning may then invoke portions of the antenna or parasitic elements to resonate and transceive at a specific frequency band. Further, a phase shift adjustment and/or parasitic elements may be used to alter lobe directionality of the antennas for particular tune states. By tuning the operating RF at the antennas 346-1, 346-2, 346-3, 346-4, 346-5, 346-6, the information handling system 300 may be tuned to a specific RF band and channel used to be communicatively coupled to an access point. Additionally, the tuner 350-1, 350-2, 350-3, 350-4, 350-5, 350-6 may allow the direction of the RF transmissions to and from the antennas 346-1, 346-2, 346-3, 346-4, 346-5, 346-6 to be changed based on external interferences such as the presence of a stylus, a user's hand or the orientation of the information handling system 300 as described herein. This further allows the communication coupling of the information handling system 300 to an access point to be relatively more secure and reliable.

In an embodiment, the information handling system 300 may include a CPU, an embedded controller (EC), and core system 390 to help execute the computer readable program code described herein. In and embodiment, the CPU, an embedded controller (EC), and core system 390 may execute the BIOS and OS. BIOS firmware/software functions to initialize information handling system 300 on power up, to launch an OS, and to manage input and output interactions between the OS and the other elements of information handling system 300 including the request for and receipt of the network telemetry data and operating characteristics.

Figure 4:
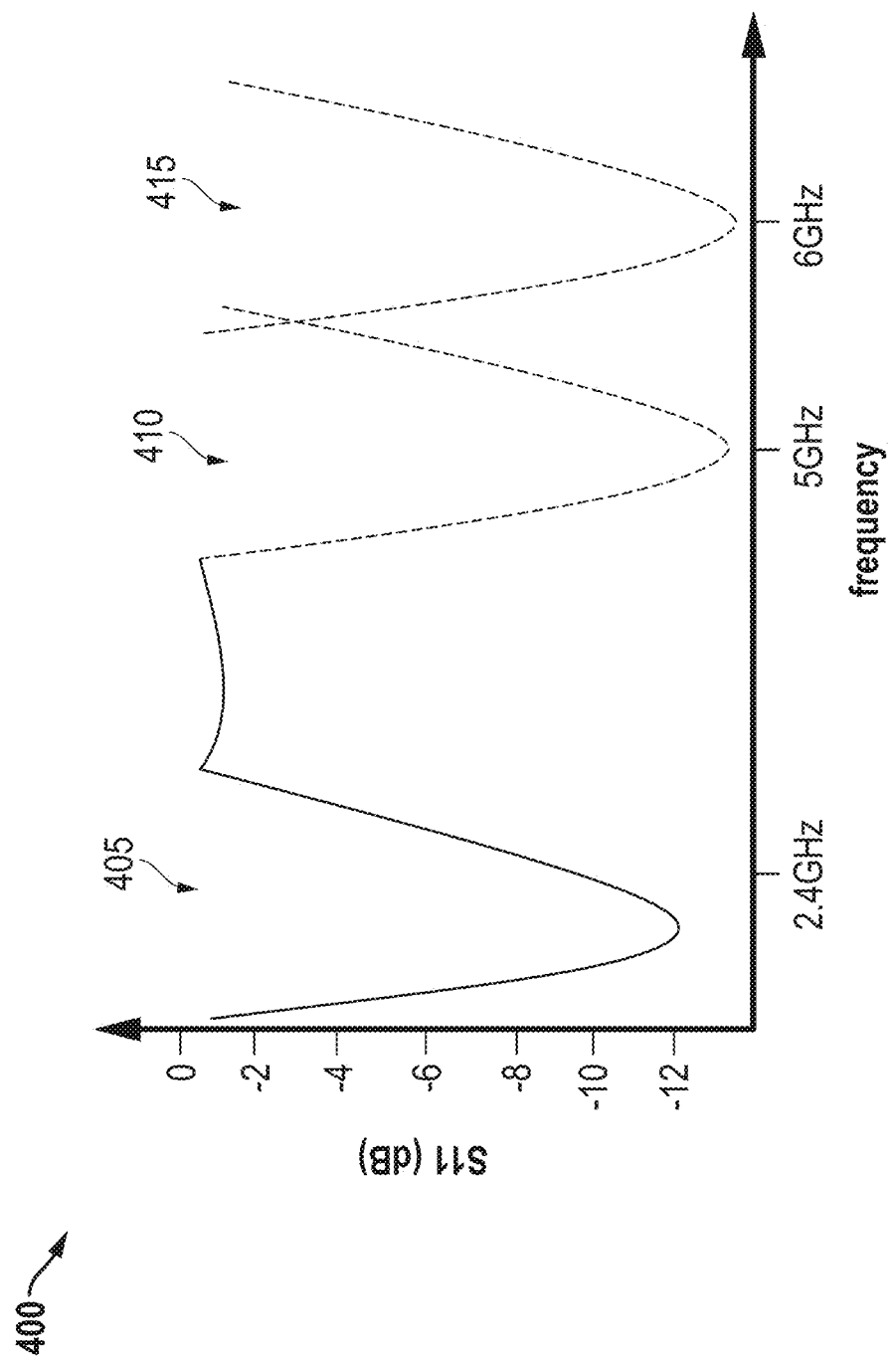
FIG. 4 is a frequency versus reflected power graph illustrating a number of frequency bands to which the antenna coupled to a port may transceive according to another embodiment of the present disclosure.

FIG. 4 is a frequency versus reflected power graph 400 of a wireless signal illustrating a number of frequency bands to which an antenna coupled to a port may achieve reflected power levels according to another embodiment of the present disclosure. With reference to FIG. 3, the graph 400 shows one or more antennas may be tuned, via the tuners, to operate at any RF based on the network telemetry data and operating characteristics and when determined after the execution of the antenna tuning algorithm. In an embodiment, specific RF bands at a 2.4 GHz band 405, a 5 GHz 410, and/or a 6 GHz band 415 may be achieved at a given antenna. The 2.4 GHz band may include a range of channels around the 2.4 GHz band from, for example, 1.9 GHz to 2.9 GHz. The 5 GHz band may include a range of channels around the 5 GHz band from, for example, 4 GHz to 6 GHz and may be selected based on, for example, the network telemetry data indicating that the information handling system may be operatively coupled to a wireless access point using a Wi-Fi 6 protocol. The 6 GHz band may include a range of channels around the 6 GHz band from, for example, 5 GHz to 7 GHz and may be selected based on, for example, the network telemetry data indicating that the information handling system may be operatively coupled to a wireless access point using a Wi-Fi 6E protocol.

Again, during operation of the information handling system, the antenna controller may receive network telemetry data and operating characteristics of the information handling system. By using this data as input into the antenna tuning algorithm, the antenna controller may determine which network to operatively couple the information handling system to and, therefore, determine at which tune state to tune the individual antennas to via the tuners described herein. Thus, where one or more antennas is tuned to operate at the 2.4 GHz band 405, the antenna controller may determine that a 5 GHz band 410 or a 6 GHz band may better accommodate the transmission of data to and from the information handling system based on those available networks and communication protocols. As such the antenna controller may send signals to the individual tuners to adjust the impedance at the antennas and tune those antennas to transceive at those frequencies.

Figure 5:
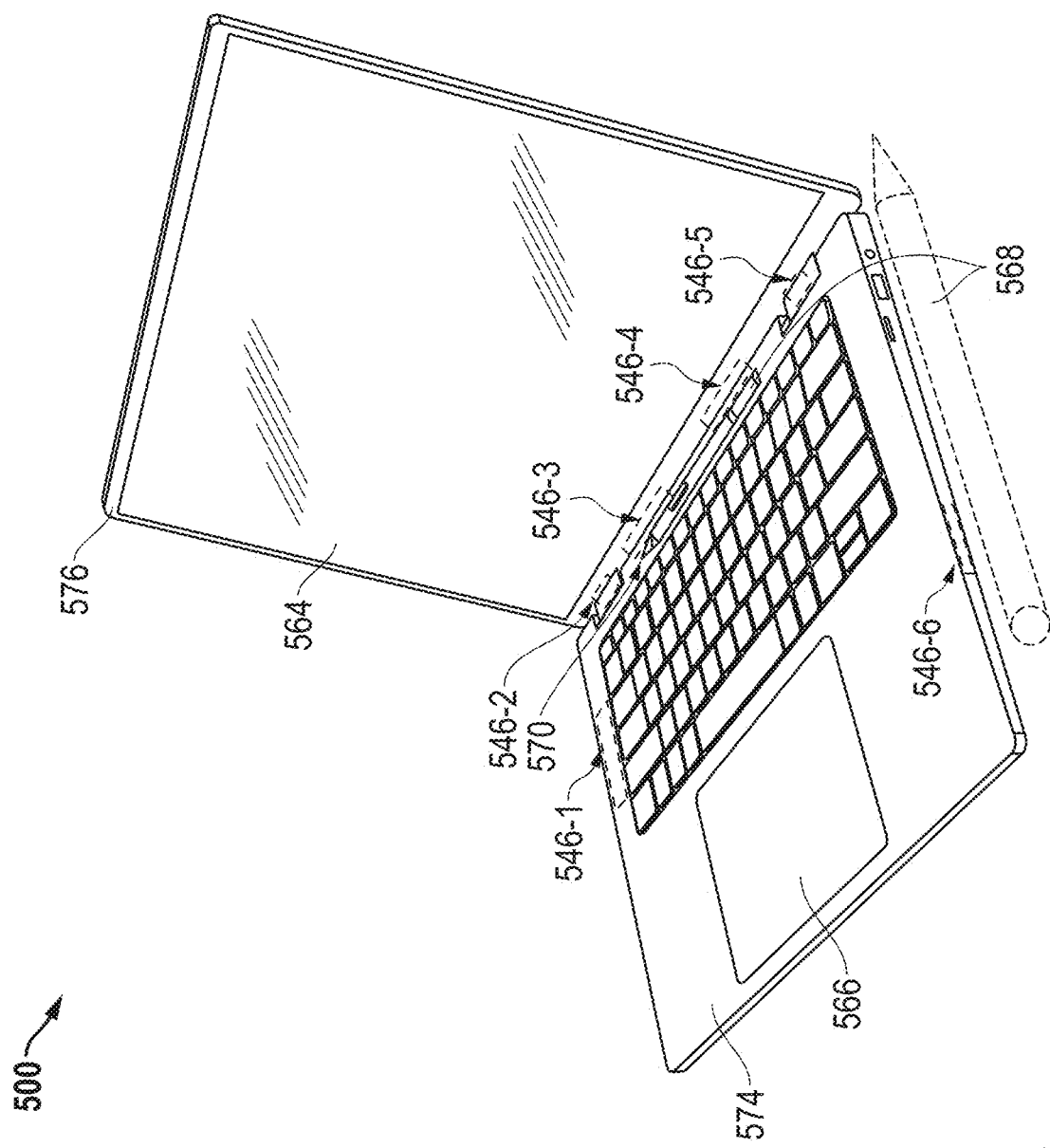
FIG. 5 is a graphic diagram illustrating an information handling system including a stylus according to another embodiment of the present disclosure.

FIG. 5 is a graphic diagram illustrating an information handling system 500 including a stylus 568 according to another embodiment of the present disclosure. As described herein, the operating characteristics may include data descriptive of the presence and location of a stylus 568 used as an input device at the information handling system 500. This stylus 568 may be secured to the chassis of the information handling system 500 at, for example, a stylus docking port 568. In an embodiment, the stylus docking port 570 may be used to both secure the stylus 568 to the chassis of the information handling system 500 when not in use as well as a charging station in those embodiments where the stylus 568 includes its own rechargeable battery used to operate the stylus 568.

As described herein, the presence of the stylus 568 at or near any antenna formed within the information handling system 500 may affect the transmission capabilities of those antenna. Some antennas may be formed in the display chassis 564 of the information handling system 500 and some antennas may be formed in the base chassis 566 of the information handling system. The locations of these antennas may vary, however, the presence of a user's body or the stylus 568 itself may cause the proximity sensors described herein to provide SAR data to the antenna controller indicative of some of the EM radiation of the RF signals being absorbed.

In a specific example embodiment, an antenna (e.g., second antenna 546-2, third antenna 546-3, fourth antenna 546-4, and fifth antenna 546-5) may be formed close to the stylus docking port 570 such as in a hinge or at the bottom of the display chassis 564 or at a top portion of the base chassis 574. In this case, when the stylus 568 is docked in the stylus docking port 570, its presence may alter those antennas' ability to transmit and receive data at a specifically tuned RF. The execution of the antenna tuning algorithm described herein, however, may accommodate for a change in realized RF by using the position and presence data of the stylus 568 to fine tune an antenna 546-1, 546-2, 546-3, 546-4, 546-5, 546-6 to operate at a predetermined frequency such as those associated with the Wi-Fi 6 or 6E protocols. Similarly, the presence of the stylus 568 at or near the base chassis may also affect the transmission capabilities of an antenna positioned in the base chassis 566 (e.g., a first antenna 546-1 and sixth antenna 546-6). The execution of the antenna tuning algorithm described herein, however, may accommodate for a change in realized RF transception by using the position and presence data of the stylus 568 to fine tune any given antenna to operate at a predetermined frequency such as those associated with the Wi-Fi 6 or 6E protocols. These adjustments may be seen in FIG. 6 more clearly.

In an embodiment, the orientation of the information handling system 500 may affect the transception capabilities of the antennas 546-1, 546-2, 546-3, 546-4, 546-5, 546-6. In this embodiment, the information handling system 500 may gather operating characteristics that include an orientation of the information handling system 500 and use that data as input into the antenna tuning algorithm. In an embodiment, the orientation of the information handling system 500 may include a tablet configuration, a dual tablet configuration, a laptop configuration, a tent mode configuration, a book configuration, among others. In the context of the information handling system 500 being a 360-degree-type laptop, a number of sensors operatively coupled to the integrated sensor hub, for example, may be used to determine the orientation the information handling system 500. These variety of sensors may include, for example, a hall effect sensor, a magnetometer, a proximity sensor, a hinge sensor, a light sensor, and a camera, an accelerometer, a gyroscope, an orientation sensor in addition to other sensors. The data obtained by these sensors, as described herein, may be used to tune the antennas 546-1, 546-2, 546-3, 546-4, 546-5, 546-6 in order to increase signal reliability and communicative access to an access point. In a specific embodiment, the display chassis 576 with its display device 564 may be moved relative to the base chassis 574 such that that base chassis 574 is placed against a back side of the display device 564 to place the information handling system 500 in to a tablet orientation. In this example embodiment, the transception capabilities of the antennas 546-1, 546-2, 546-3, 546-4, 546-5, 546-6 of the information handling system 500 may be affected. In this embodiment, the execution of the antenna tuning algorithm by an antenna controller may cause a tuner associated with each of the antennas 546-1, 546-2, 546-3, 546-4, 546-5, 546-6 to be tuned to correct for any interference that may arise from placing the information handling system 500 in this orientation.

Figure 6:
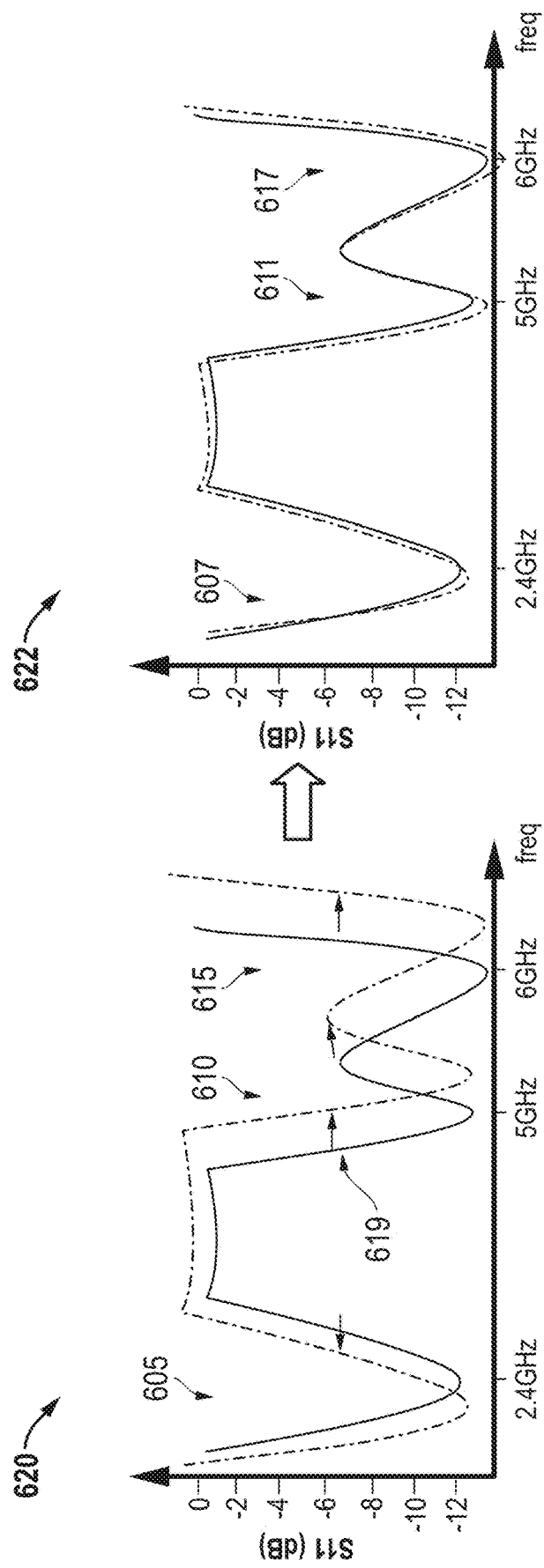
FIG. 6 is a pair of frequency versus power graphs illustrating the antenna of the present specification detuned prior to execution of the methods described herein based on a location of a stylus relative to the information handling system and after the execution of those methods according to an embodiment of the present disclosure.

FIG. 6 is a pair of frequency versus power graphs 620, 622 illustrating the antenna of the present specification detuned prior to execution of the methods described herein based on a location of a stylus relative to the information handling system or based on a configuration of the information handling system and after the execution of those methods according to an embodiment of the present disclosure. In this embodiment, the left graph 622 shows the offset 619 of the RF signals if the antennas remained in a first tune state (e.g., tune state 0, 1, 2, or 3 in Table 1) while in the presence of the stylus described herein.

This offset shows that the 2.4 GHz frequency band 605, the 5 GHz frequency band 610, and the 6 GHz frequency band 615 have been offset relatively significantly due to the presence of the stylus 568 of the information handling system at or near an antenna. In this embodiment, the tuning of the antennas and within the presence of the stylus of the information handling system has shifted the 2.4 GHz frequency band 605 to lower frequencies and the 5 GHz frequency band 610 and 6 GHz frequency band 615 to higher frequencies.

During operation of the antenna controller and execution of the antenna tuning algorithm, this may be corrected by tuning one or more antennas to a second tune state. As shown in the right graph 622, the 2.4 GHz frequency band 607, the 5 GHz frequency band 611, and the 6 GHz frequency band 617 may be corrected. For example, the data associated with the operating characteristics of the information handling system describing the location and presence of the stylus may be provided to the antenna controller. With this input and along with the received network telemetry data, orientation data, and other operating characteristics, the antenna controller may execute the antenna tuning algorithm described herein. As output, the antenna controller determines how and to what extent to tune each antenna via a tuner in order to achieve less reflection of power and greater power transmission for any of the 2.4 GHz frequency band 607, the 5 GHz frequency band 611, and the 6 GHz frequency band 617 at any individual or group of antennas.

Figure 7:
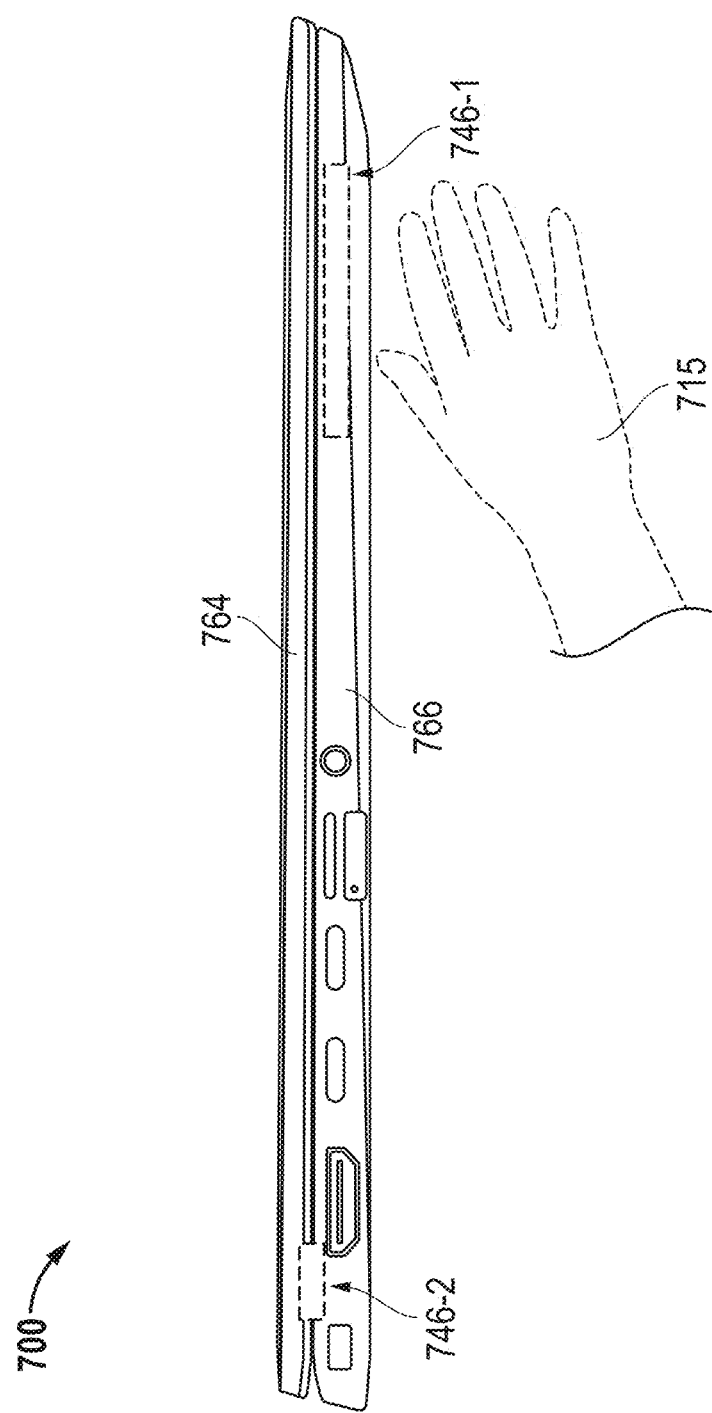
FIG. 7 is a block diagram illustrating an information handling system with a hand located near the information handling system according to another embodiment of the present disclosure.

FIG. 7 is a block diagram illustrating an information handling system 700 with a hand 715 located near the information handling system 700 according to another embodiment of the present disclosure. FIG. 7 also shows that the display chassis 705 of the information handling system is in a closed state. This closed state places the display chassis 705 against the base chassis 710 as shown in FIG. 7.

As described herein, the presence of the user's hand 715 (or any other body part) at or near any antenna formed within the information handling system 700, and in an aspect the detected configuration (e.g., closed state) may affect the transmission capabilities of those antenna formed within the display chassis 764, a hinge of the information handling system (e.g., second antenna 746-2), or the base chassis 766 (e.g., first antenna 746-1) of the information handling system 700. Some antennas may be formed in the display chassis 764 of the information handling system 700 while other antennas may be formed in the base chassis 766 of the information handling system 700 including a hinge between the base chassis 766 and display chassis 764. The locations of these antennas may vary, however, the presence of a user's body such as the user's hand 715 itself may cause the proximity sensors described herein to provide SAR data to the antenna controller indicative of some of the EM radiation of the RF signals being absorbed.

In a specific example embodiment, an antenna may be formed close to a side of the display chassis 766. In this case, when the user's hand 715 its present near the side of the base chassis 766, its presence may alter those antennas' ability to transmit and receive data at a specifically tuned RF. The execution of the antenna tuning algorithm described herein, however, may accommodate for a change in realized RF by using the data descriptive of the presence of the user's hand 715 near the antenna from a proximity sensor and configuration data as well as wireless network data received to fine tune any given antenna to operate at a predetermined frequency such as those associated with the Wi-Fi 6 or 6E protocols determined as the protocols to be used with an available access point. These adjustments may be seen in FIG. 8 more clearly.

Figure 8:
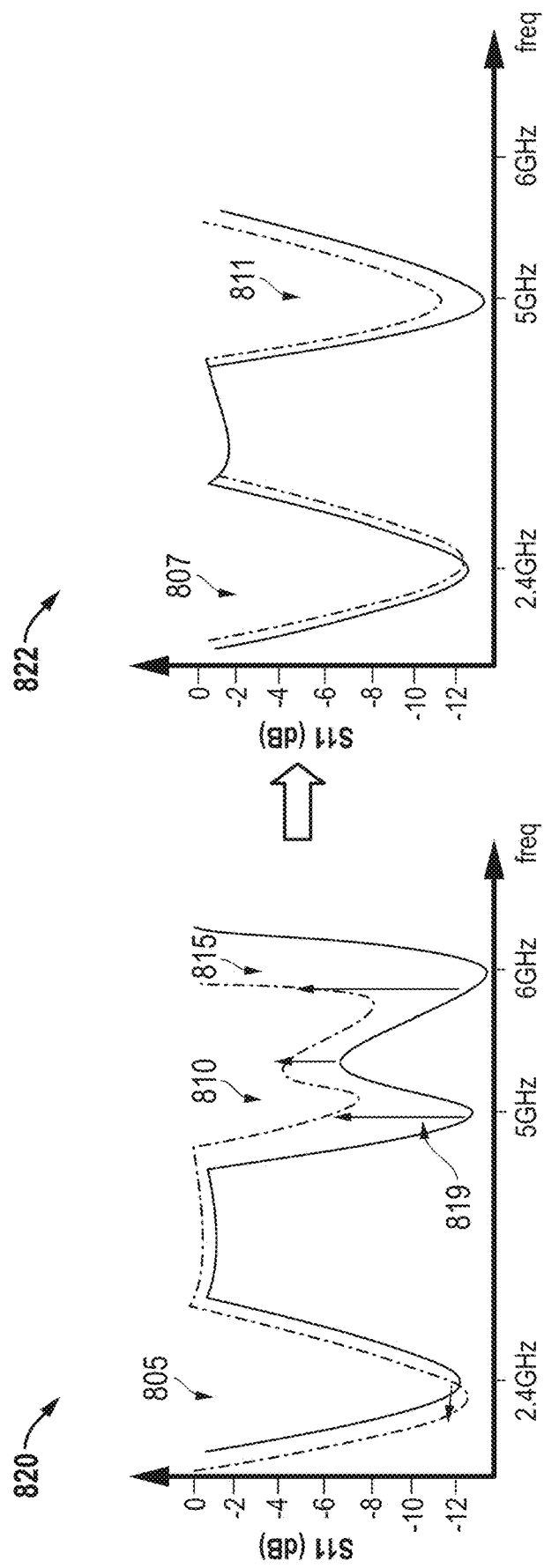
FIG. 8 is a pair of frequency versus power graphs illustrating the antenna of the present specification detuned prior to execution of the methods described herein based on a location of a user's hand relative to the information handling system and after the execution of those methods according to an embodiment of the present disclosure.

FIG. 8 is a pair of frequency versus power graphs 820, 822 illustrating the antenna of the present specification detuned prior to execution of the methods described herein based on a location of a user's hand relative to the information handling system and after the execution of those methods, respectively, according to an embodiment of the present disclosure. In this embodiment, the left graph 822 shows the offset 819 of the RF signals if the antennas remained in a first tune state (e.g., tune state 0, 1, 2, or 3 in Table 1) while in the presence of the user's hand described herein.

This offset 819 shows that the 2.4 GHz frequency band 805, the 5 GHz frequency band 810, and the 6 GHz frequency band 815 have been offset relatively significantly due to the presence of the user's hand 715 at or near an antenna. In this embodiment, the tuning of the antennas and within the presence of the user's hand 715 has shifted the 2.4 GHz frequency band 805 to lower frequencies and the 5 GHz frequency band 810 and 6 GHz frequency band 815 to lower frequencies with less reflected power (S11) and thus better RF power transmission.

During operation of the antenna controller and execution of the antenna tuning algorithm, this may be corrected at one or more antennas to a second tune state. As shown in the right graph 822, the 2.4 GHz frequency band 807 and the 5 GHz frequency band 811 may be corrected. In this specific embodiment such correction via the tuning of the antennas may eliminate the ability to use the 6 GHz frequency band which is fed back to the antenna controller, but 2.4 GHz and 5 GHz may be improved in the second tune states. For example, the data associated with the operating characteristics of the information handling system describing the location and presence of the user's hand 715 (e.g., SAR data) may be provided to the antenna controller. With this input and along with the received network telemetry data, the antenna controller may execute the antenna tuning algorithm described herein. As output, the antenna controller determines how and to what extent to tune each antenna via a tuner in order to achieve any of the 2.4 GHz frequency band 807 and the 5 GHz frequency band 811 at any individual or group of antennas and may further determine which wireless protocols may be better to use.

Figure 9:
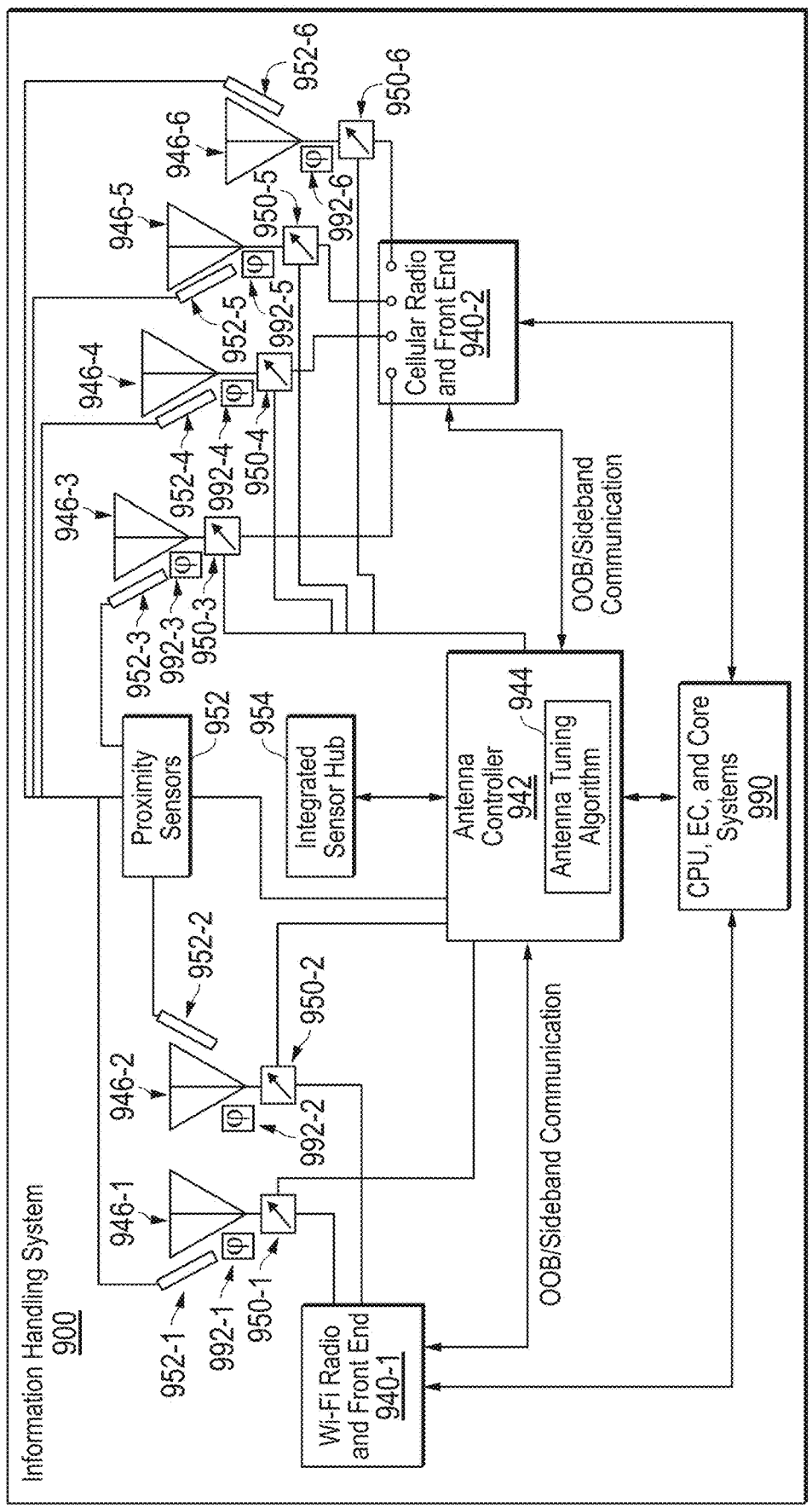
FIG. 9 is a block diagram illustrating an information handling system including radio and antenna systems according to another embodiment of the present disclosure.

FIG. 9 is a block diagram illustrating an information handling system 900 including radio 940-1, 940-2 and antenna systems according to another embodiment of the present disclosure. In this embodiment, the information handling system 900 may include six antennas, two WLAN antennas 946-1, 946-2 operatively coupled to a Wi-Fi radio and front end 940-1 and four WWAN antennas 946-3, 946-4, 946-5, 946-6 operatively coupled to a cellular radio and front end 940-2. The arrangement of the WWAN antennas 946-3, 946-4, 946-5, 946-6 to the cellular radio and front end 940-2 and the WLAN antennas 946-1, 946-2 to the Wi-Fi radio and front end 940-1 may be similar to the antenna and radio/front end (e.g., 140 in FIG. 1) as described and shown in FIG. 1.

In the example embodiment shown in FIG. 9, each antenna may be operatively coupled to their respective radios and front ends 940-1, 940-2 via a tuner 950-1, 950-2, 950-3, 950-4, 950-5, 950-6. Although not shown, the present embodiments contemplates that an RF switch (not shown) may also be included similar to that described in connection with FIG. 1 (e.g., 150, FIG. 1). Each of the tuners 950-1, 950-2, 950-3, 950-4, 950-5, 950-6 include any number or arrangement of electrical components that include resistor, inductors, or capacitors, for example, arranged in series or in parallel for one or more resistor, inductors, or capacitors (RLC) circuits for tuning. In an embodiment, the tuners 950-1, 950-2, 950-3, 950-4, 950-5, 950-6 may include a RLC circuits such as those within series or parallel RLC circuit components. In an embodiment, the tuners 950-1, 950-2, 950-3, 950-4, 950-5, 950-6 may include a plurality of selectable, passive circuits for tuning the WWAN antennas 946-3, 946-4, 946-5, 946-6 and WLAN antennas 946-1, 946-2 to operate at a specific RF based on the output from the execution of the antenna tuning algorithm 944 by the antenna controller 942. Switches may be used to select one or more passive circuits or components in series or parallel to tune impedance of the antenna feed to an antenna. In another embodiment, the tuners 950-1, 950-2, 950-3, 950-4, 950-5, 950-6 may be an active circuit that includes any variable electrical component (e.g., variable capacitor, resistor, inductor) that allows the antenna controller 942 to tune the antennas 946 accordingly. In another embodiment, the tuners 950-1, 950-2, 950-3, 950-4, 950-5, 950-6 may include both selectable, passive RLC circuits and active electrical components used to roughly tune and fine tune the WWAN antennas 946-3, 946-4, 946-5, 946-6 and WLAN antennas 946-1, 946-2 to operate at a specific RF. As shown in FIG. 9, the antenna controller 942 is operatively coupled to each tuner 950-1, 950-2, 950-3, 950-4, 950-5, 950-6 so that the appropriate signals are sent to these tuners 950-1, 950-2, 950-3, 950-4, 950-5, 950-6 in order to provide the correct impedance value to the WLAN antennas 946-1, 946-2 and WWAN antennas 946-3, 946-4, 946-5, 946-6, individually, to cause them to operate efficiently at a specific RF.

During operation of the information handling system 900, the antenna controller 942 may communicate with the processor to establish a sideband communication (e.g., out of band (OOB) communication) with one or more networks (not shown). As described herein, this sideband communication is established in order to request and receive, network telemetry data descriptive of, at least, network operating frequency bands and network frequency channels. This data may be received OOB wirelessly at one of the cellular radio and front end 940-2 and Wi-Fi radio and front end 940-1 and passed to the antenna controller 942 by, for example, an embedded controller in some embodiments.

As described herein, the network telemetry data may be accessed by the information handling system 900 accessing a backend server. In an embodiment, this backend server may be executing an optimizing service such as Dell Optimizer®. The optimizing service may operatively couple to one or more internet and cellular network service providers or to a private, enterprise operated WLAN or WWAN network. These internet and cellular network service providers or a network administrator may provide the optimizing service with, at least, the network operating frequency bands and network frequency channels used to access a network. In an embodiment, the internet and cellular network service providers may be contractually engaged with the optimizing service to provide this network telemetry data. As described herein, additional network telemetry data may be retrieved such as available data bandwidth on the networks, congestion statistics on the networks, data throughput, and signal strength, among others. The frequency of establishing this sideband communication link between the information handling system 900 and the edge devices (e.g., base station or wireless access point and edge computing systems) or a backend server may be any period of time or may be continually. In an embodiment, the sideband communication link may be established if and when any operating characteristics associated with the operation of the information handling system have changed. In the case of the example embodiment shown in FIG. 9, both the Wi-Fi radio and front end 940-1 and cellular radio and front end 940-2 may be engaged by an embedded controller in this process to establish sideband communications OOB and provide the relevant network telemetry data to the antenna controller 942.

Also, during operation, the information handling system 900 may request and receive operating characteristics associated with the operation of the information handling system. In an embodiment, the operating characteristics may include an orientation of the information handling system 900. In an embodiment, the orientation of the information handling system 900 may include a tablet configuration, a dual tablet configuration, a laptop configuration, a tent mode configuration, a book configuration, among others. In the context of the information handling system 900 being a 360-degree-type laptop, a number of sensors operatively coupled to the integrated sensor hub 954 may be used to determine the orientation the information handling system 900. These variety of sensors may include, for example, a hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. In the embodiment, where an orientation sensor is used, a plurality of orientation sensors may be used to reference direction such as "up" or "north" in order to determine the orientation of the information handling system 900. In an example embodiment, a hall effect sensor may be placed at any location within the chassis of the information handling system 900 to detect the position of the individual parts of the information handling system 900 relative to each other. In a specific embodiment where the information handling system 900 is a laptop-type information handling system 900, the hall effect sensor may be placed in one or more of a display portion or base portions of the information handling system 900. In this embodiment, the hall effect sensor, in combination with any orientation sensor, gyroscope, and/or accelerometer, may detect when the display portion is moved away from a top surface of a based portion, a relative position of the display portion to the base portion, and/or when a back side of the display portion is placed against a bottom portion of the base portion of the information handling system 900. As described herein, this allows the hall effect sensor and other sensors to detect whether the laptop-type information handling system 900 is placed in a tablet configuration, a dual tablet configuration, a laptop configuration, a tent mode configuration, a book configuration, as well as several other configurations described herein. The hall effect sensor and other sensors may be similarly used in a dual screen-type information handling system 900 in order to detect the relative positions of each of the screens. Again, any data obtained by the hall effect sensor and other sensors is presented to the antenna controller 942 for the antenna controller 942 to interpret and provide that orientation data as input to the antenna tuning algorithm 944 as described herein.

In an embodiment, the operating characteristics may further include wireless application telemetry data descriptive of resource requirements associated with the execution of a software application by the information handling system 300. This application telemetry data may include data that describes operating application needs, Wi-Fi availability, data bandwidth available, signal quality, and data congestion on the WLAN or WWAN networks to facilitate the operation of the executed application. For example, where an online gaming application is being executed by a processing device of the information handling system 300, the bandwidth requirements with a low latency may be required and this data is included as part of the operating characteristics as application telemetry data. Where, for example, the application being executed by a processing device of the information handling system 300 is an email application, latency and bandwidth may not be in issue as email may be sent and received in bursts thereby also creating application telemetry data describing these other application requirements.

In an embodiment, a magnetometer may operate as an orientation sensor and may be used to measure the earth's magnetic field at any location in order to detect an orientation of the information handling system 900 relative to that magnetic field. In a specific embodiment, the magnetometer may be a three-axis magnetometer that eliminates the sensitivity to the way in which the information handling system 900 is held or positioned. Similarly, a gyroscope sensor may be used to measure any changes in direction along an x-axis, a y-axis, and a z-axis according to a Cartesian coordinate system. Again, any data obtained by the magnetometer is presented to the antenna controller 942 for the antenna controller to use as input to the antenna tuning algorithm 944 being executed at the antenna controller 942.

In an embodiment, the antenna controller 942 may receive SAR data from an integrated sensor hub 954 or one or more proximity sensor elements 952-1, 952-2, 952-3, 952-4, 952-5, 952-6 operatively coupled to a proximity sensor 952. In this embodiment, the proximity sensor elements 952-1, 952-2, 952-3, 952-4, 952-5, 952-6 may detect a hand or body part near an antenna for specific absorption rate (SAR) purposes at each of the WLAN antennas 946-1, 946-2 and WWAN antennas 946-3, 946-4, 946-5, 946-6. The proximity data detected by the proximity sensors 952-1, 952-2, 952-3, 952-4, 952-5, 952-6 may determine whether there is an obstacle such a user's body or a stylus placed by the antenna elements 946-1, 946-2, 946-3, 946-4, 946-5, 946-6. This proximity data may also be provided to the antenna controller 942 to be used as input during execution of the antenna tuning algorithm 944 by the antenna controller 942.

When the antenna controller 942 receives the network telemetry data and operating characteristics, the antenna controller 942 may execute the antenna tuning algorithm 944 used to determine whether or not to issue instructions to one or more of the tuners 950-1, 950-2, 950-3, 950-4, 950-5, 950-6 at the antennas 946-1, 946-2, 946-3, 946-4, 946-5,

946-6 to tune the antennas to transceive data at a frequency band, in an open loop fashion, commensurate with the telemetry data descriptive of the wireless link. In an embodiment, the antenna tuning algorithm 944 may be in the form of a look-up table. An example look-up table is shown in Table 1.

Each of the antennas 946-1, 946-2, 946-3, 946-4, 946-5, 946-6 may be operated and tuned, via their respective tuners 950-1, 950-2, 950-3, 950-4, 950-5, 950-6 according to the example scenarios shown in Table 1. Although Table 1 only shows tune states associated with two antennas, the present specification contemplates that any number of antennas may also be assigned a specific tune state (e.g., "0," "1," "2," and "3") based on the received operating characteristics and network telemetry data. In the embodiment shown in FIG. 9, the WLAN antennas 946-1, 946-2 and WWAN antennas 946-3, 946-4, 946-5, 946-6 may each operate under a N×N MIMO arrangement in order to increase the data throughput at the RF each antenna 946-1, 946-2, 946-3, 946-4, 946-5, 946-6 is tuned to. Similar to the description of FIG. 1, each individual antennas 946-1, 946-2, 946-3, 946-4, 946-5, 946-6 or group of antennas may be tuned to a different frequency to allow the information handling system 900 to communicate with multiple networks.

In an embodiment, the tune states (e.g., "0," "1," "2," and "3") described in Table 1 may describe how the antenna controller causes the RF switch to tune each of the antennas 946-1, 946-2, 946-3, 946-4, 946-5, 946-6. As described herein, an RF switch may include any switch that may operatively couple any of the Wi-Fi radio and front end 940-1 or cellular radio and front end 940-2 to each of the antennas 946-1, 946-2, 946-3, 946-4, 946-5, 946-6 via a specific RLC circuit in the tuner 950-1, 950-2, 950-3, 950-4, 950-5, 950-6 or to set the directionality of the antenna lobes of the transmission signals. By including or excluding certain RLC circuits in a bank of RLC circuits or components, the RF switch may switch from one passive tuner 950-1, 950-2, 950-3, 950-4, 950-5, 950-6 to another in order to achieve a specific tune state at those antennas 946-1, 946-2, 946-3, 946-4, 946-5, 946-6 so that the antennas 946-1, 946-2, 946-3, 946-4, 946-5, 946-6 may operate at a specific frequency as described herein. Thus, in an embodiment, a "tune state" may be defined as a selection or deselection of an RLC circuit or component of an RLC circuit made to cause the antennas 946-1, 946-2, 946-3, 946-4, 946-5, 946-6 to operate at a specific frequency. In another embodiment, the tuners 950-1, 950-2, 950-3, 950-4, 950-5, 950-6 may include a number of active circuits such as a variable resistor, inductor, and/or capacitor used to actively change the impedance at each of antennas 946-1, 946-2, 946-3, 946-4, 946-5, 946-6 in order to cause the antennas 946-1, 946-2, 946-3, 946-4, 946-5, 946-6 to operate at a specific frequency. In another embodiment, both active and passive elements may be included within the tuners 950-1, 950-2, 950-3, 950-4, 950-5, 950-6 so that rough and fine tuning of the antennas 946-1, 946-2, 946-3, 946-4, 946-5, 946-6 may be achieved in order to cause the antennas 946-1, 946-2, 946-3, 946-4, 946-5, 946-6 to operate not only within a specific frequency band but also at a specific channel within that frequency band. The tuning may then invoke portions of the antenna or parasitic elements to resonate and transceive at a specific frequency band. Further, a phase shift adjustment and/or parasitic elements may be used to alter lobe directionality of the antennas for particular tune states. By tuning the operating RF at the antennas 946-1, 946-2, 946-3, 946-4, 946-5, 946-6, the information handling system 900 may be tuned to a specific RF band and channel used to be communicatively coupled to an access point. Additionally, the tuners 950-1, 950-2, 950-3, 950-4, 950-5, 950-6 may allow the direction of the RF transmissions to and from the antennas 946-1, 946-2, 946-3, 946-4, 946-5, 946-6 to be changed based on external interferences such as the presence of a stylus, a user's hand or the orientation of the information handling system 900 as described herein. This further allows the communication coupling of the information handling system 900 to an access point to be relatively more secure and reliable.

In an embodiment, the information handling system 900 may include a CPU, an embedded controller (EC), and core system 990 to help execute the computer readable program code described herein. In and embodiment, the CPU, an embedded controller (EC), and core system 990 may execute the BIOS and OS. BIOS firmware/software functions to initialize information handling system 900 on power up, to launch an OS, and to manage input and output interactions between the OS and the other elements of information handling system 900 including the request for and receipt of the network telemetry data and operating characteristics.

In an embodiment, the information handling system 900 may include a phase shift network include a number of phase shift modules 992-1, 992-2, 992-3, 992-4, 992-5, 992-6. Each of the phase shift modules 992-1, 992-2, 992-3, 992-4, 992-5, 992-6 may be operatively coupled to the antenna controller 942 via their respective tuners 950-1, 950-2, 950-3, 950-4, 950-5, 950-6 or may be individually operatively coupled to the antenna controller 942 directly. Each phase shift module 992-1, 992-2, 992-3, 992-4, 992-5, 992-6 may be used to adjust the directionality of a transception signal from the antenna. Each phase shift modules 992-1, 992-2, 992-3, 992-4, 992-5, 992-6 may further include implementation of a plurality of parasitic elements to direct the electromagnetic patterns at the antennas 946-1, 946-2, 946-3, 946-4, 946-5, 946-6. For example, electromagnetic patterns may be directed towards a base station 162 or wireless access point 160, FIG. 1. The operation of the phase shift modules 992-1, 992-2, 992-3, 992-4, 992-5, 992-6 may change the direction of any lobe of the EM radiation patterns emitted by the antennas 946-1, 946-2, 946-3, 946-4, 946-5, 946-6. By steering these beams or EM radiation patterns at the antennas 946-1, 946-2, 946-3, 946-4, 946-5, 946-6, the ability of the antennas 946-1, 946-2, 946-3, 946-4, 946-5, 946-6 to be operatively coupled to the edge devices may be increased thereby increasing the reliability of the transception of the data to and from the information handling system. This directionality of the lobes may further be a part of the tune states such as those of Table 1. Directionality of the antenna transception patterns may be adjusted by the antenna tuning algorithm 944 in response to the orientation of the information handling system 900, the network telemetry data, the congestion data, traffic data, and data bandwidth, among other data described herein that is associated with those wireless communication channels available to the information handling system 900, the proximity data, and the application executing on the information handling system, among other types of data, as described herein.

Figure 10:
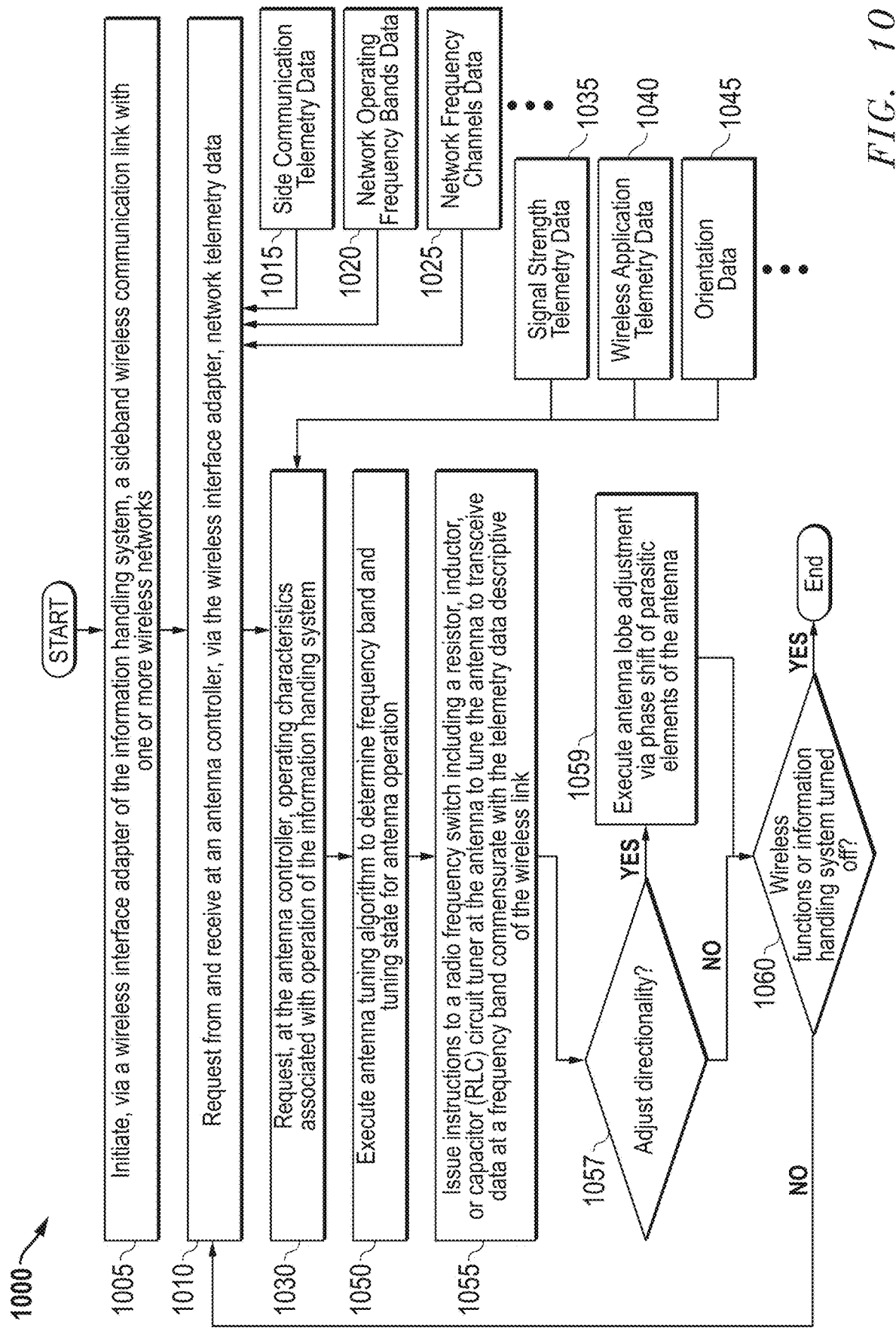
FIG. 10 is a flow diagram illustrating a method of tuning an antenna of an information handling system according to an embodiment of the present disclosure.

FIG. 10 is a flow diagram illustrating a method 1000 of tuning an antenna of an information handling system according to an embodiment of the present disclosure. The method 1000 may include, at block 1005, initiating, via a wireless interface adapter of the information handling system, a sideband wireless communication link with one or more wireless networks. In an embodiment, the information handling system may be similar to the information handling system described in connection with FIG. 1 with one or more antennas associated with a radio and front end. These multiple antennas may be used to create, for example, a MIMO radio transmission for a wireless adapter. As described herein, the antenna controller may be allowed to adjust or tune the frequencies at which the antennas transmit and receive data as well as select among frequency bands.

At block 1010, the method 1000 may further include requesting from and receiving at an antenna controller, via the wireless interface adapter, network telemetry data for one or more WLANs or WWANs and via an information handling system management system such as Dell Optimizer®. This network telemetry data may include network operating frequency bands and network frequency channels among other data. As mentioned at block 1005, this sideband communication network telemetry data 1015 may be obtained through a sideband communication to any of a plurality of available networks (e.g., WWAN or WLAN networks) ad conducted via the embedded controller.

This data may be received at a radio to the antenna controller. As described herein, the network telemetry data may be accessed by the information handling system accessing a backend server. In an embodiment, this backend server may be executing an optimizing service such as Dell Optimizer® for managing information handling system of an enterprise. The optimizing service may operatively couple to one or more internet and cellular network service providers or privately administered WLAN or WWAN. These WLAN or WWAN networks may provide the optimizing service with, at least, the network operating frequency bands at block 1020 and network frequency channels data at block 1025 used to access a network. In an embodiment, the WLAN or WWAN networks may be contractually engaged with the optimizing service to provide this network telemetry data. Additional network telemetry data may be retrieved from the internet and cellular network service providers such as available data bandwidth on the networks, congestion statistics on the networks, data throughput, and signal strength, among others. The frequency of establishing this sideband communication link between the information handling system and the base station or wireless access points and optimizing service may be any period of time or may be continually. In an embodiment, the sideband communication link may be established if and when any operating characteristics associated with the operation of the information handling system have changed.

The method may continue at block 1030 with requesting, and receiving, operating characteristics associated with the operation of the information handling system at the antenna controller. These operating characteristics may include, among other data, signal strength telemetry data 1035, wireless application telemetry data 1040, and orientation data 1045. The application telemetry data is descriptive of an application being executed by the information handling system may use the network to transmit and receive data. These applications may include, for example, a music streaming application, an audio/video streaming application, a videoconferencing application, an email application, an online gaming application, among others. The execution of each of these types of applications may require more or less bandwidth, data throughput, and signal strength that may or may not be available to the information handling system via a certain WLAN, WWAN, or other network connection. For example, a gaming application may require a relatively high data throughput. In this example, the antenna controller may receive this data and determine which network connection would best facilitate the execution of this application based on the execution of the antenna tuning algorithm. Based on whether any identified network connections would better benefit the operation of the application being executed, the antenna controller may execute the antenna tuning algorithm to include this data as input in order to select the appropriate radio frequency (RF) to use to transmit and receive data via the antenna according to the embodiments described herein.

The orientation data 1045 may be generated via any number of sensors that may detect the orientation of the information handling system in order to determine whether the antennas will be placed in an optimal position to send and receive data. In an embodiment, the orientation of the information handling system may include a tablet configuration, a dual tablet configuration, a laptop configuration, a tent mode configuration, a book configuration, among others. In the context of the information handling system being a 360-degree-type laptop, a number of sensors operatively coupled to the integrated sensor hub may be used to determine the orientation the information handling system. These variety of sensors may include, for example, a hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. In the embodiment, where an orientation sensor is used, a plurality of orientation sensors may be used to reference direction such as "up" or "north" in order to determine the orientation of the information handling system. In an example embodiment, a hall effect sensor may be placed at any location within the chassis of the information handling system to detect the position of the individual parts of the information handling system relative to each other. In a specific embodiment where the information handling system is a laptop-type information handling system, the hall effect sensor may be placed in one or more of a display portion or base portions of the information handling system. In this embodiment, the hall effect sensor, in combination with any orientation sensor, gyroscope, and/or accelerometer, may detect when the display portion is moved away from a top surface of a based portion, a relative position of the display portion to the base portion, and/or when a back side of the display portion is placed against a bottom portion of the base portion of the information handling system. As described herein, this allows the hall effect sensor and other sensors to detect whether the laptop-type information handling system is placed in a tablet configuration, a dual tablet configuration, a laptop configuration, a tent mode configuration, a book configuration, as well as several other configurations described herein. The hall effect sensor and other sensors may be similarly used in a dual screen-type information handling system in order to detect the relative positions of each of the screens. Again, any data obtained by the hall effect sensor and other sensors is presented to the antenna controller for the antenna controller to interpret and provide that orientation data as input to the antenna tuning algorithm as described herein.

In an embodiment, a magnetometer may operate as an orientation sensor and may be used to measure the earth's magnetic field at any location in order to detect an orientation of the information handling system relative to that magnetic field. In a specific embodiment, the magnetometer may be a three-axis magnetometer that eliminates the sensitivity to the way in which the information handling system is held or positioned. Similarly, a gyroscope sensor may be used to measure any changes in direction along an x-axis, a y-axis, and a z-axis according to a Cartesian coordinate system. Again, any data obtained by the magnetometer is presented to the antenna controller 142 for the antenna controller to use as input to the antenna tuning algorithm 144 being executed at the antenna controller.

In an embodiment, the signal strength telemetry data 1035 may include data descriptive of a stylus or a user's hand being close to any given antenna RSSI data, bit error rate (BER) and other data drawn from the radios about the signal strength 1035 at each antenna. In an embodiment, this data may be taken from on-board wireless adapter radio modules. In this embodiment, the integrated sensor hub may include or be operatively coupled to a proximity sensor. The proximity sensors may detect proximity of a hand or persons body part for SAR data at each antenna. The SAR data detected by the proximity sensor may determine whether there is an obstacle such a user's body placed between the antenna and a wireless access point or base station. This SAR data may also be provided to the antenna controller to be used as input during execution of the antenna tuning algorithm.

In an embodiment, the information handling system may also include a stylus detector that, in an embodiment, includes a hall effect sensor that may determine whether the stylus is magnetically coupled to the information handling system or not. In the case where the stylus is present, the antenna controller may have confirmed the presence of the stylus from data obtained at the integrated sensor hub (e.g., location sensor within the stylus indicates its location relative to the information handling system). In some embodiments, the stylus may be docked at docking station formed in the information handling system and the first antenna may be formed into the chassis of the information handling system at or close to that docking station. In another embodiment, the stylus may be placed next to the information handling system and detected using a similar sensor that tells the antenna controller of the location of the stylus next to, for example an antenna.

At this point at block 1050, the antenna controller or other processing device executes the antenna tuning algorithm to determine at which frequency band to operate any of the antennas. This may include selecting among available protocols from various WLAN access points or WWAN base stations to determine an active RF band for the antennas. The antenna controller may execute the antenna tuning algorithm further to determine whether or not to issue instructions to the RF switch including a tuner (e.g., resistor, inductor, and capacitor (RLC) circuit tuner) at the antennas to tune the antennas to transceive data more efficiently within at a frequency band, in an open loop fashion, commensurate with the telemetry data descriptive of the wireless link. Examples of the execution of this antenna tuning algorithm may be shown in Table 1 herein. These may include selecting among a plurality of tune states in an embodiment. Further, tune states may include frequency shift tuning as well as lobe directionality adjustments in some embodiments.

Table 1 shows a first column with a list of triggers that help to influence the frequency at which each antenna is tuned to or directionality. As described herein, the antenna controller may initiate the sideband communication in order to retrieve network telemetry data as described in the second column "Source" indicating the source of this network telemetry data (e.g., network telemetry data form the radio initiating the sideband communication). Among this network telemetry data is data descriptive of network operating frequency bands and network frequency channels at each available network. If, as in row three of the Table 1, a network is present that operates using the Wi-Fi 6E protocol, this may trigger the antenna controller to access the RF switch to tune, via the tuner, each antenna in order to cause each controlled antenna to operate at a Wi-Fi 6E frequency that includes frequencies between 1 and 7.125 GHz. However, where the higher frequencies are available, the antennas may be tuned to those higher frequencies in order to increase the data transmission and reception characteristics and capabilities of the information handling system such as at 6 GHz.

Table 1 also shows tune states of the first antenna and the second antenna. Continuing with the example embodiment in row 2 of table 1, the tune state of the first antenna may be "tune state 1" and the tune state of the second antenna is "tune state 1." These tune states (e.g., "0," "1," "2," and "3") may indicate to the antenna controller how to cause the RF switch to tune each of the antennas. As described herein, the RF switch may include any switch that may operatively couple the front end to each of the antennas via a specific RLC circuit or circuit components in the tuner. By including or excluding certain RLC circuits, the RF switch may switch from one passive tuner to another in order to achieve a specific tune state at those antennas so that the antennas may operate more efficiently closer to a specific target frequency as described herein. In another embodiment, the tuner may include a number of active circuits such as a variable resistor, inductor, and/or capacitor used to actively change the impedance at each of the antennas in order to cause the antennas to operate at a specific frequency. In another embodiment, both active and passive elements may be included within the tuner so that rough and fine tuning of the antennas may be achieved in order to cause the antennas to operate not only within a specific frequency band but also at a specific channel within that frequency band.

In an embodiment, a phase shift adjustment and/or parasitic elements may be used to alter lobe directionality of the antennas for particular tune states. By tuning the operating RF at the antennas, the information handling system may be tuned to a specific RF band and channel used to be communicatively coupled to an access point. Additionally, the tuner may allow the direction of the RF transmissions to and from the antennas to be changed based on external interferences such as the presence of a stylus, a user's hand or the orientation of the information handling system as described herein. This further allows the communication coupling of the information handling system to an access point to be relatively more secure and reliable.

In an embodiment, a phase shift adjustment and/or parasitic elements may be used to alter lobe directionality of the antennas for particular tune states. By tuning the operating RF at the antennas, the information handling system may be tuned to a specific RF band and channel used to be communicatively coupled to an access point. Additionally, the tuner may allow the direction of the RF transmissions to and from the antennas to be changed based on external interferences such as the presence of a stylus, a user's hand or the orientation of the information handling system as described herein. This further allows the communication coupling of the information handling system to an access point to be relatively more secure and reliable.

Table 1 also shows additional triggers that influence how the antenna controller, via the RF switch and tuner, adjusts the operating frequencies of the antennas. As described herein, the information handling system may include one or more proximity sensors that detect the presence of a user's body or, for example, a stylus near any one of the antennas. Because the electromagnetic radiation (ER) at the antennas can be absorbed by the user's hand and the stylus, the proximity sensor may detect a SAR value and provide this SAR data to the antenna controller for appropriate tuning of the antennas accordingly. For example, in row four of table 1, the trigger from the network telemetry data indicates that the antennas are to operate as Wi-Fi 6 antennas while the source data from the proximity sensor and the network telemetry data indicate that the first antenna should be tuned at a tune state of 2 while the second antenna indicates that it should be tuned to a tune state of 1. In this example, the SAR data from the proximity sensor may have indicated that at the first antenna there as some EM absorption due to the presence of the user's body or the stylus. In the case where the stylus is present, the antenna controller may have confirmed the presence of the stylus from data obtained at the integrated sensor hub (e.g., location sensor within the stylus indicates its location relative to the information handling system). In some embodiments, the stylus may be docked at docking station formed in the information handling system and the first antenna may be formed into the chassis of the information handling system at or close to that docking station. Whatever the case may be, the first antenna and second antenna may be individually tuned so that each of the antennas operate at the same or similar frequency channel and band. In an embodiment, the directionality of the transception signals at each antenna may be changed or a different antenna may be selected to achieve transceptions at a specific RF band. In order to tune each individual antenna, each antenna may be operatively couple to the front end via an individual tuner that includes passive, active, or both passive and active RLC circuits as described herein. In an embodiment, each of the antennas may also include an RF switch that may be allowed to switch from one passive RLC circuit of the tuner to another in order to roughly tune the individual antennas to a specific frequency band or changes directionality of the lobes of the transception signals or selects a different antenna.

In an embodiment, as described in table 1 at row 7 for example, the orientation of the information handling system may also be considered when tuning the antennas to a specific operating frequency. In this example in row 7, the orientation of the information handling system indicates that the lid is closed. Here, for example, the information handling system may be a laptop-type information handling system where the lid or display housing is closed against the base portion of the information handling system. This orientation may be detected by the integrated sensor hub using a number of different sensors described herein such as hall effect sensors. This orientation data is relayed to the antenna controller and used as input to the antenna tuning algorithm, and based on the example scenarios in table 1, to adjust the operating frequencies of the antennas accordingly in order to achieve the highest data throughput at the specific orientation of the information handling system by shifting the operation to improve transception at a target frequency. In an embodiment, the directionality of the RF signals at an antenna may be changed based on the orientation data. In an embodiment, a different antenna may be selected based on that orientation if the orientation data indicates that a specific antenna is not available to transceive signals.

At block 1055, the method 1000 may continue with issuing instructions to a radio frequency switch including a resistor, inductor, and capacitor (RLC) circuit tuner at the antenna feed to tune the antenna to transceive data more efficiently at a target frequency band, in an open loop fashion, commensurate with the telemetry data descriptive of the wireless link. As a result of the output from execution of the antenna tuning algorithm, the antenna controller may send signals to the switch, tuner, and, in some embodiments, a phase shift module to tune the antennas in order to adjust the antennas to operate better at a specific frequency and adjust the phase of the EM radiation patterns at the antennas or use parasitic elements to adjust directionality.

The method 1000 may, at block 1057, may determine whether the directionality of the transception signals from the antennas is to be adjusted. Based on the telemetry data, orientation data, and other operational data received by the antenna controller, the direction of the transception signals may be adjusted to increase the signal strength between the antenna in the information handling system and a base station, access point, or edge device. This may be done to help overcome RF interference due to, for example, a user's body part or a stylus as described herein. In an embodiment, the antenna controller may direct the use of a phase shift adjustment and/or parasitic elements to alter lobe directionality of the antennas for particular tune states as described herein.

Where the directionality of the RF signal is to be adjusted at block 1057, the method 1000 may continue with executing the antenna lobe adjustments via a phase shift or parasitic elements on an antenna used to transceive data at block 1059. Again, the antenna controller may provide signals to the phase shifter and/or tuner to adjust these lobes or, alternatively, may direct those certain parasitic elements be operatively coupled to the antennas to be adjusted. Whether the directionality of the RF signal is to be adjusted at block 1057 or not, the method 1000 may proceed onto block 1060.

At block 1060, determining whether the wireless functions or the information handling system itself has been turned off. Where the wireless functions are continuing to be operated, the method 1000 may continue at block 1010 with requesting and receiving the network telemetry data. Where either the wireless functions or the information handling system itself have been turned off, the method may end.

The blocks of the flow diagrams of FIG. 10 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a processor, a memory and a power management unit (PMU);
   a wireless interface adapter to communicate via an antenna to a wireless network;
   an antenna controller to:
      receive, via a sideband wireless communication link, network telemetry data descriptive of network operating frequency bands and network frequency channels from a remote optimizing information handling system management system for a wireless protocol of the wireless network;
      detect at least one detuning trigger for a first network operating frequency band for a wireless protocol link operating with the wireless network; and
      execute instructions of an antenna tuning algorithm to issue instructions to a radio frequency switch including a resistor, inductor, and capacitor (RLC) circuit tuner at the antenna to tune the antenna to transceive data at the network operating frequency band to a target frequency commensurate with the network telemetry data descriptive of the wireless link for an operational tune state.

2. The information handling system of claim 1 further comprising:
   a serial interface operatively coupling the antenna controller to the RLC circuit tuner to tune the antenna to transceive data at 5 GHz or 6 GHz frequencies.

3. The information handling system of claim 1 further comprising:
   operating characteristics including the orientation of the information handling system, proximity data from a proximity sensor, and location of a stylus of the information handling system.

4. The information handling system of claim 1 further comprising:
   an embedded controller to establish the sideband wireless communication link for the antenna controller and wireless front end to communicate with a backend server hosting the remote optimizing information handling system management system on one or more networks to retrieve the network telemetry data via a Wi-Fi out-of-band (OOB) link.

5. The information handling system of claim 1 further comprising:
   the RLC circuit tuner including a phase shift network to adjust the directionality of a transception signal from the antenna according to the tune state.

6. The information handling system of claim 1 further comprising:
   a proximity sensor hub to receive data from a plurality of proximity sensor elements as the detuning trigger received by the antenna controller.

7. The information handling system of claim 1 further comprising:
   a stylus location sensor to detect a position of a stylus of the information handling system and determine whether the stylus is docked in a stylus docking station, the stylus location sensor to send stylus location data to the antenna controller as the detuning trigger.

8. A method of antenna control at an information handling system comprising:
   receiving at an antenna controller, via a wireless interface adapter on a sideband wireless communication link, network telemetry data descriptive of network operating frequency bands and network frequency channels of a wireless network used by the information handling system;
   receiving, at the antenna controller, an indication of at least one detuning trigger for a network operating frequency band for a wireless link of the wireless network used by the information handling system; and
   executing code instructions of an antenna tuning algorithm to issue instructions to a radio frequency switch including a resistor, inductor, and capacitor (RLC) circuit tuner at an antenna to tune the antenna to transceive data at the network operating frequency band to a target frequency commensurate with the network telemetry data descriptive of the wireless link for an operational tune state.

9. The method implemented at an information handling system of claim 8 further comprising:
   tuning the antenna to transceive data at 5 GHz or 6 GHz frequencies via a serial interface operatively coupling the antenna controller and wireless front end to the RLC circuit tuner.

10. The method implemented at an information handling system of claim 8 further comprising:
    the detuning trigger selected from an orientation of the information handling system, proximity data from a proximity sensor, or detection of a stylus at the information handling system.

11. The method implemented at an information handling system of claim 8 further comprising:
    communicating with a backend server hosting the remote optimizing information handling system management system on one or more networks to retrieve the network telemetry data using the sideband wireless communication link established by the antenna controller via a Wi-Fi out-of-band (OOB) link.

12. The method implemented at an information handling system of claim 8 further comprising:
    adjusting the directionality of a transception signal from the antenna via a phase shift network formed within the RLC circuit tuner according to the operational tune state.

13. The method implemented at an information handling system of claim 8 further comprising:
    receiving data from a plurality of proximity sensor elements at a proximity sensor hub as the detuning trigger received by the antenna controller.

14. The method implemented at an information handling system of claim 8 further comprising:
    with a stylus location sensor, detecting a position of a stylus of the information handling system and determining whether the stylus is docked in a stylus docking station, the stylus location sensor to send stylus location data to the antenna controller as the detuning trigger associated with the operation of the information handling system.

15. An information handling system comprising:
    a processor, a memory and a power management unit (PMU);
    a wireless interface adapter to communicate via an antenna to a wireless network;
    an antenna controller to:

receive, via a sideband wireless communication link, network telemetry data descriptive of network operating frequency bands and network frequency channels from a remote optimizing information handling system management system for a wireless protocol of the wireless network;

detect at least one detuning trigger for a first network operating frequency band for a wireless protocol link operating with the wireless network; and execute instructions of an antenna tuning algorithm to determine a first tune state of the antenna;

execute instructions of an antenna tuning algorithm to issue instructions to a radio frequency switch including a resistor, inductor, and capacitor (RLC) circuit tuner at the antenna; and the antenna receive the instructions at the radio frequency switch and tune to transceive data based on said instructions at the network operating frequency band to a target frequency commensurate with the network telemetry data descriptive of the wireless link for an adjusted second tune state for operation of the wireless interface adapter.

16. The wireless interface adapter of claim 15 further comprising further comprising:
a serial interface operatively coupling the antenna controller to the radio frequency switch including the RLC circuit tuner to tune the antenna to transceive data at 5 GHz or 6 GHz frequencies.

17. The wireless interface adapter of claim 15 further comprising further comprising:
the detuning trigger selected from a detected orientation of the information handling system, a specific absorption rate (SAR) data from a SAR detector, or a location of a stylus of the information handling system.

18. The wireless interface adapter of claim 15 further comprising further comprising:
the RLC circuit tuner including a phase shift network to adjust the directionality of a transception signal from the antenna.

19. The wireless interface adapter of claim 15 further comprising:
a proximity sensor to receive data from a plurality of SAR detectors as the detuning trigger received by the antenna controller.

20. The wireless interface adapter of claim 15 further comprising:
a stylus location sensor to detect a position of a stylus of the information handling system and determine whether the stylus is docked in a stylus docking station, the stylus location sensor to send stylus location data to the antenna controller as the detuning trigger associated with the operation of the information handling system.

* * * * *